(12) United States Patent
Fujishiro et al.

(10) Patent No.: US 9,699,702 B2
(45) Date of Patent: Jul. 4, 2017

(54) COMMUNICATION CONTROL METHOD, MASTER BASE STATION, SECONDARY BASE STATION, AND USER TERMINAL

(71) Applicant: KYOCERA CORPORATION, Kyoto (JP)

(72) Inventors: Masato Fujishiro, Yokohama (JP); Katsuhiro Mitsui, Kawasaki (JP); Yushi Nagasaka, Yokohama (JP); Kugo Morita, Yokohama (JP); Fangwei Tong, Machida (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/222,588

(22) Filed: Jul. 28, 2016

(65) Prior Publication Data

US 2016/0337925 A1   Nov. 17, 2016

Related U.S. Application Data

(63) Continuation of application No. PCT/JP2015/052780, filed on Jan. 30, 2015.
(Continued)

(51) Int. Cl.
*H04W 36/28* (2009.01)
*H04W 16/32* (2009.01)
(Continued)

(52) U.S. Cl.
CPC ....... *H04W 36/28* (2013.01); *H04L 29/12575* (2013.01); *H04W 16/32* (2013.01);
(Continued)

(58) Field of Classification Search
None
See application file for complete search history.

(56) References Cited

U.S. PATENT DOCUMENTS

| 8,693,438 B2 | 4/2014 | Takahashi et al. |
| 2015/0156686 A1 | 6/2015 | Kikuchi |

(Continued)

FOREIGN PATENT DOCUMENTS

| JP | 2011-97530 A | 5/2011 |
| WO | 2011/162197 A1 | 12/2011 |
| WO | 2014/013846 A1 | 1/2014 |

OTHER PUBLICATIONS

International Search Report issued in PCT/JP2015/052780; mailed Mar. 31, 2015.
(Continued)

*Primary Examiner* — Diane Mizrahi
(74) *Attorney, Agent, or Firm* — Studebaker & Brackett PC

(57) ABSTRACT

A communication control method according to a first aspect is a method in a mobile communication system for supporting dual connectivity communication using a master base station for establishing RRC connection with a user terminal and a secondary base station for providing additional radio resources to the user terminal. The communication control method comprises: an inter-master base station handover procedure for performing handover of the user terminal from a source master base station to a target master base station without changing the secondary base station.

8 Claims, 29 Drawing Sheets

Related U.S. Application Data

(60) Provisional application No. 61/934,350, filed on Jan. 31, 2014.

(51) Int. Cl.
| | |
|---|---|
| *H04W 36/00* | (2009.01) |
| *H04L 29/12* | (2006.01) |
| *H04W 36/06* | (2009.01) |
| *H04W 36/16* | (2009.01) |
| *H04W 76/04* | (2009.01) |
| *H04W 88/08* | (2009.01) |
| *H04W 88/16* | (2009.01) |

(52) U.S. Cl.
CPC ....... *H04W 36/0055* (2013.01); *H04W 36/06* (2013.01); *H04W 36/165* (2013.01); *H04W 76/046* (2013.01); *H04W 88/08* (2013.01); *H04W 88/16* (2013.01)

(56) References Cited

U.S. PATENT DOCUMENTS

2016/0135103 A1* 5/2016 Lee .................. H04W 28/08 455/444
2016/0227448 A1* 8/2016 Wu .................. H04W 36/0005

OTHER PUBLICATIONS

Written Opinion issued in PCT/JP2015/052780; mailed Mar. 31, 2015.

3rd Generation Partnership Project; Technical Specification Group Radio Access Network; Study on Small Cell enhancements for E-UTRA and E-UTRAN; Higher layer aspects; 3GPP TR 36.842 V12.0.0; Dec. 2013; pp. 1-71; Release 12; 3GPP Organizational Partner&.
Ericsson; Signalling procedures for dual connectivity; 3GPP TSG-RAN WG2 #84; Tdoc R2-134219; Nov. 11-15, 2013; San Francisco, USA.
ZTE Corporation; Analysis on the Solutions for the Prioritized Scenarios of MeNB Handover; 3GPP TSG-RAN3 Meeting #83; R3-140053; Feb. 10-14, 2014; Prague, Czech Republic.
3GPP R2-140135, CMCC, "Handling of MeNB HO and SeNB change for dual connectivity operation," Prague, Czech Republic, Feb. 10-14, 2014, 8 pp.
3GPP R2-140335, Samsung, "SCG user plane security in 1A," Prague, Czech Republic, Feb. 10-14, 2014, 5 pp.
3GPP R3-132204, ZTE Corporation, "Signalling flows of solution 1A," San Francisco, CA, Nov. 11-15, 2013, 8 pp.
3GPP R3-140117, Huawei, "MeNB Mobility Procedure," Prague, Czech Republic, Feb. 10-14, 2014, 6 pp.
JP Office Action dated Sep. 13, 2016 from corresponding JP Appl No. 2015-560058, 4 pp.
JP Office Action dated Sep. 13, 2016 from corresponding JP Appl No. 2016-148816, 5 pp.
JP Office Action dated Sep. 13, 2016 from corresponding JP Appl No. 2016-148818, 5 pp.
Japanese Office Action issued on Dec. 20, 2016 in corresponding Japanese Application No. 2016-148818 with Concise Statement of Relevance; 6pp.
Ericsson; "Dual connectivity—mobility scenarios"; 3GPP TSG-RAN WG3 Meeting #83; R3-140346; Prague, Czech Republic, Feb. 10-14, 2014; 8pp.

* cited by examiner

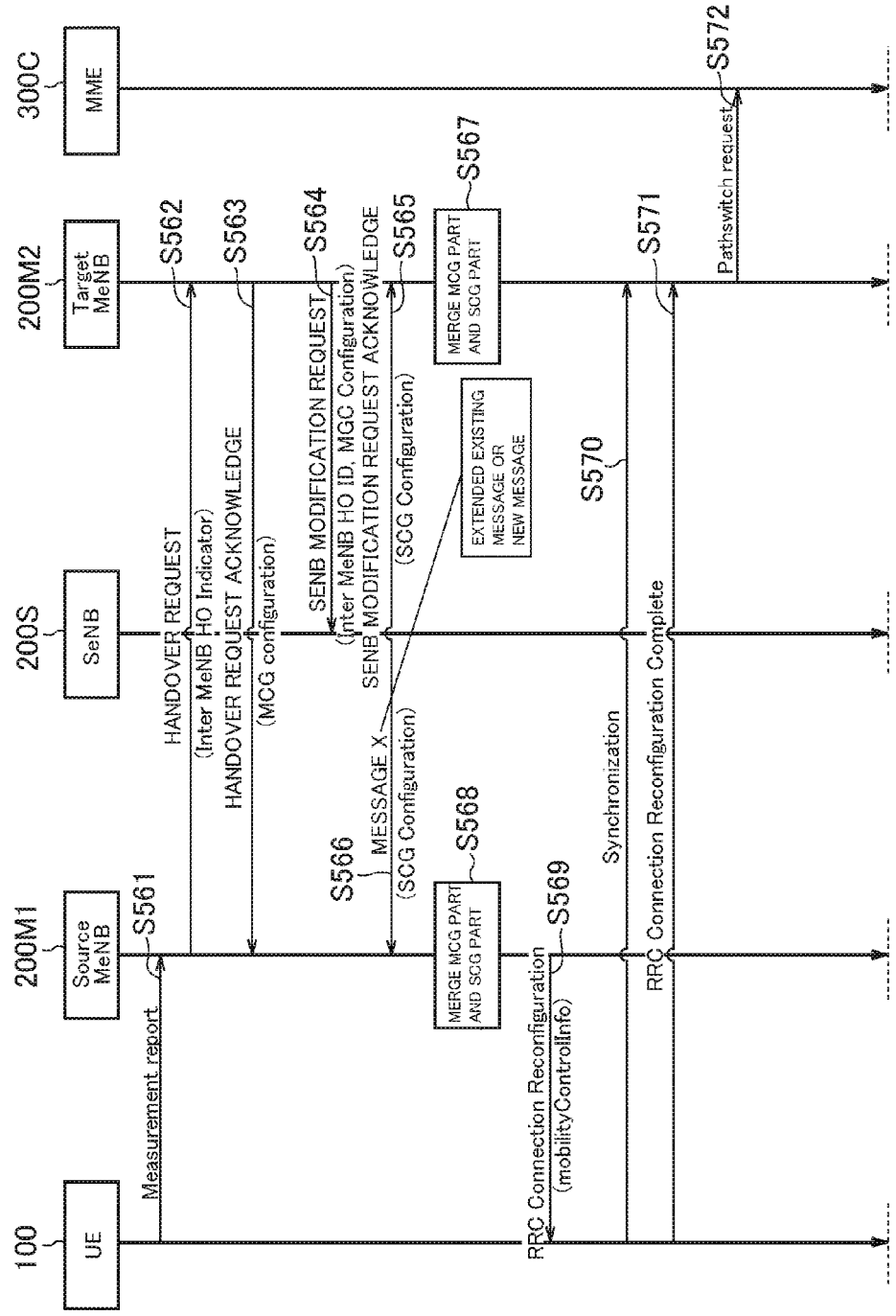

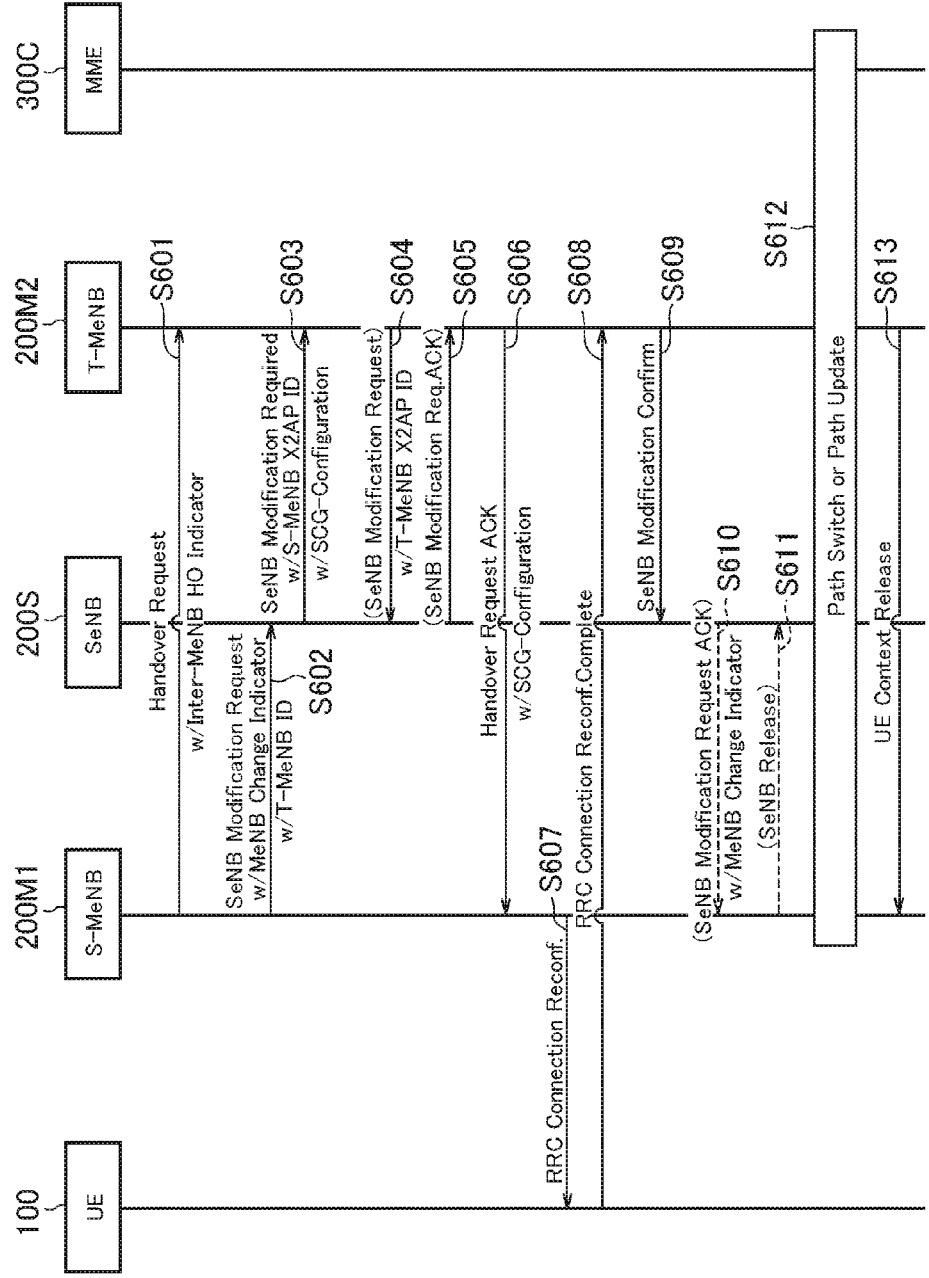

COMMUNICATION CONTROL METHOD, MASTER BASE STATION, SECONDARY BASE STATION, AND USER TERMINAL

TECHNICAL FIELD

The present disclosure relates to a communication control method, a master base station, a secondary base station, and a user terminal used in a mobile communication system.

BACKGROUND ART

In the 3GPP (3rd Generation Partnership Project), which is a standardization project of mobile communication systems, efficient use of a specific base station (e.g., a small cell base station) with a narrower coverage than that of a general base station (e.g., a macro cell base station) is being considered.

In the 3GPP, introduction of a dual connectivity scheme (Dual connectivity) is planned in Release 12 or thereafter (see Non Patent Literature 1). In the dual connectivity scheme, user terminal establishes connections with a plurality of base stations (a general base station and a specific base station) simultaneously. Since radio resources are assigned to the user terminal from each base station, an improvement in throughput is expected. The dual connectivity scheme is referred also to as inter-base station carrier aggregation (inter-eNB CA).

In the dual connectivity scheme, only one base station (hereafter referred to as a "master base station") establishes an RRC connection with the user terminal among a plurality of base stations that establish connections with the user terminal. On the other hand, another base station among the plurality of base stations (hereafter referred to as a "secondary base station") does not establish an RRC connection with the user terminal but provides the user terminal with additional radio resources.

PRIOR ART LITERATURES

Non Patent Literature

Non Patent Literature 1: 3GPP technical report "TR 36.842 V12.0.0" Jan. 7, 2014

SUMMARY

User terminal in an RRC connected state performs handover in association with a movement.

However, if the user terminal in the RRC connected state performs communication in a dual connectivity scheme, there is a problem that a process related to the handover of the user terminal becomes complicated.

Then, an object of the present disclosure is to provide a communication control method, a master base station, a secondary base station, and a user terminal that implement efficient handover in the dual connectivity scheme.

A communication control method according to a first aspect is a method in a mobile communication system for supporting dual connectivity communication using a master base station for establishing RRC connection with a user terminal and a secondary base station for providing additional radio resources to the user terminal. The communication control method comprises: an inter-master base station handover procedure for performing handover of the user terminal from a source master base station to a target master base station without changing the secondary base station.

A target master evolved Node-B (MeNB) according to a second aspect is an MeNB for a mobile communication system supporting dual connectivity communication using: the MeNB for establishing a radio resource control (RRC) connection with a user equipment (UE); and a secondary evolved Node-B (SeNB) for providing additional radio resources to the UE. The target MeNB includes a controller containing at least one processor and at least one memory, and configured to perform controls for an inter-MeNB handover procedure that performs handover of the UE from a source MeNB to the target MeNB without changing the SeNB. The controller is further configured, for the inter-MeNB handover procedure, to cause the target MeNB to perform processes of: receiving a handover request massage from the source MeNB, the handover request massage including information relating to the SeNB, the information including a global eNB ID, which is identification information of the SeNB; and transmitting an SeNB addition request message to the SeNB in response to receiving the handover request massage, the SeNB addition request message used to configure the SeNB as a new SeNB for the target MeNB.

A secondary evolved Node-B (SeNB) according to a third aspect is an SeNB for a mobile communication system supporting dual connectivity communication using: a master evolved Node-B (MeNB) for establishing a radio resource control (RRC) connection with a user equipment (UE); and the SeNB for providing additional radio resources to the UE. The SeNB includes a controller containing at least one processor and at least one memory, and configured to perform controls for an inter-MeNB handover procedure that performs handover of the UE from a source MeNB to a target MeNB without changing the SeNB. The controller is further configured, for the inter-MeNB handover procedure, to cause the SeNB to perform a process of: receiving an SeNB addition request message from the target MeNB that receives a handover request massage from the source MeNB, the SeNB addition request message used to configure the SeNB as a new SeNB for the target MeNB.

A source master evolved Node-B (MeNB) according to a fourth aspect is an MeNB for a mobile communication system supporting dual connectivity communication using the MeNB for establishing a radio resource control (RRC) connection with a user equipment (UE) and a secondary evolved Node-B (SeNB) for providing additional radio resources to the UE. The source MeNB includes a controller containing at least one processor and at least one memory, and configured to perform controls for an inter-MeNB handover procedure that performs handover of the UE from the source MeNB to a target MeNB without changing the SeNB. The controller is further configured, for the inter-MeNB handover procedure, to cause the source MeNB to perform processes of: transmitting a handover request massage to the target MeNB, the handover request massage including information relating to the SeNB, the information including a global eNB ID, which is identification information of the SeNB; receiving a handover request acknowledge massage, which is response to the handover request massage, from the target MeNB, the handover request acknowledge massage including algorithm information indicating a security algorithm selected by the SeNB to perform communication with the UE; transmitting an SeNB release request message to the SeNB in response to receiving the handover request acknowledge massage, the SeNB release request message requesting release of configurations corresponding to the source MeNB; receiving a first UE context release message from the target MeNB, the first UE context release message requesting release of a UE context for the UE; and transmitting a second UE context release message to the SeNB, the second UE context release message requesting release of the UE context.

BRIEF DESCRIPTION OF DRAWINGS

FIG. 6A illustrates a data path configuration and FIG. 6B illustrates a protocol stack configuration.

FIG. 7A illustrates a data path configuration and FIG. 7B illustrates a protocol stack configuration.

FIG. 20 is a sequence diagram illustrating an inter-MeNB handover procedure according to a second modification of the third embodiment.

FIG. 21 is a sequence diagram illustrating an inter-MeNB handover procedure according to a fourth embodiment.

DESCRIPTION OF EMBODIMENTS

[Overview of Embodiments]

Figure 1:
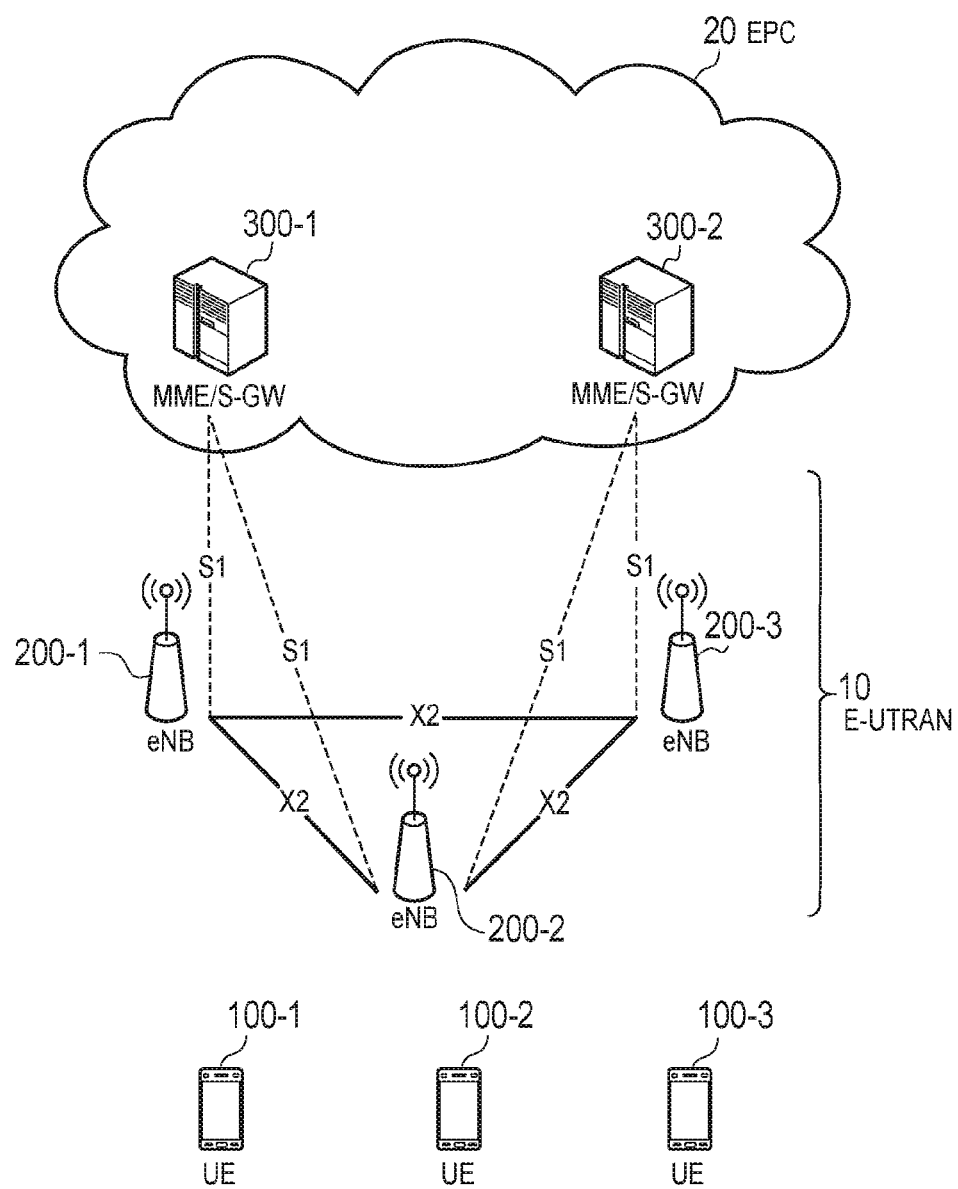
FIG. 1 is a configuration diagram of an LTE system according to first to sixth embodiments.

A communication control method according to first to sixth embodiments is a method in a mobile communication system for supporting dual connectivity communication using a master base station for establishing RRC connection with a user terminal and a secondary base station for providing additional radio resources to the user terminal. The communication control method comprises: an inter-master base station handover procedure for performing handover of the user terminal from a source master base station to a target master base station without releasing connection between the user terminal and the secondary base station.

In the first to sixth embodiments, the inter-master base station handover procedure includes a step in which the source master base station transmits, to the target master base station, a handover request for requesting handover of the user terminal The handover request includes information indicating the inter-master base station handover procedure.

In the third embodiment, the inter-master base station handover procedure includes the steps in which: the target master base station transmits, to the secondary base station, a modification request for requesting modification of configuration in the secondary base station, in response to receipt of the handover request; and the secondary base station transmits, to the target master base station, modification request acknowledge for the modification request, in response to receipt of the modification request. The modification request includes information indicating the inter-master base station handover procedure.

In the third embodiment, the inter-master base station handover procedure includes a step in which the target master base station transmits, to the source master base station, handover acknowledge for the handover request, in response to receipt of the modification request acknowledge.

In the second modification of the third embodiment, the inter-master base station handover procedure includes a step in which the target master base station transmits, to the source master base station, handover acknowledge for the handover request, before transmitting the modification request acknowledge to the secondary base station.

In the fourth embodiment, the inter-master base station handover procedure includes a step in which the source master base station transmits, to the secondary base station, a modification request for requesting modification of configuration in the secondary base station. The modification request includes the information indicating the inter-master base station handover procedure.

In the fifth embodiment, the inter-master base station handover procedure includes a step in which the secondary base station transmits, to the target master base station, a handover request for requesting handover of the user terminal, in response to receipt of the modification request.

In the sixth embodiment, the inter-master base station handover procedure includes a step in which the target master base station transmits, to the secondary base station, an addition request for configuring the secondary base station as a new secondary base station for the user terminal, in response to receipt of the handover request.

In the third to sixth embodiments, the inter-master base station handover procedure includes a step in which the source master base station receives, from the target master base station or the secondary base station, information indicating failure of the inter-master base station handover procedure, when the configuration in the secondary base station fails.

In the third to sixth embodiments, the inter-master base station handover procedure includes a step of keeping TEID in a serving gateway for a tunneling between the secondary base station and the serving gateway without changing the TEID.

A master base station according to first to sixth embodiments operates as a source master base station or target master base station in a mobile communication system for supporting dual connectivity communication using a master base station for establishing RRC connection with a user terminal and a secondary base station for providing additional radio resources to the user terminal. The master base station includes: a controller configured to control an inter-master base station handover procedure for performing handover of the user terminal from the source master base station to the target master base station without releasing connection between the user terminal and the secondary base station.

A secondary base station according to first to sixth embodiments is a secondary base station in a mobile communication system for supporting dual connectivity communication using a master base station for establishing RRC connection with a user terminal and the secondary base station for providing additional radio resources to the user terminal The secondary base station includes: a controller configured to control an inter-master base station handover procedure for performing handover of the user terminal from a source master base station to a target master base station without releasing connection between the user terminal and the secondary base station.

A user terminal according to first to sixth embodiments is a user terminal in a mobile communication system for supporting dual connectivity communication using a master base station for establishing RRC connection with the user terminal and a secondary base station for providing additional radio resources to the user terminal The user terminal includes: a controller configured to control an inter-master base station handover procedure for performing handover of the user terminal from a source master base station to a target master base station without releasing connection between the user terminal and the secondary base station.

[First Embodiment]

Hereinafter, an embodiment in which the present disclosure is applied to an LTE system is described.

(System Configuration)

FIG. 1 is a configuration diagram of an LTE system according to a first embodiment.

As illustrated in FIG. 1, the LTE system according to the first embodiment is provided with UE (User terminal) 100, E-UTRAN (Evolved-UMTS Terrestrial Radio Access Network) 10, and EPC (Evolved Packet Core) 20. The UE 100 corresponds to a user terminal The UE 100 is a mobile communication device that performs radio communication with a cell (a serving cell). A configuration of the UE 100 is described later.

The E-UTRAN 10 corresponds to a radio access network. The E-UTRAN 10 includes an eNB 200 (evolved Node-B). The eNB 200 corresponds to a base station. The eNBs 200 are mutually connected via X2 interfaces. A configuration of the eNB 200 is described later.

The eNB 200 manages one or a plurality of cells, and performs radio communication with the UE 100 that has established connection with its cell. The eNB 200 has a radio resource manage (RRM) function, a user data routing function, a measurement control function for mobility control and scheduling, and other functions. The term "cell" not only means the minimum unit of a radio communication area, but means a function to perform radio communication with the UE 100.

The EPC 20 corresponds to a core network. The EPC 20 includes an MME (Mobility Management Entity)/S-GW (Serving-Gateway) 300. The MME performs, for example, various types of mobility control to the UE 100. The S-GW performs transfer control of user data. The MME/S-GW 300 is connected to the eNB 200 via an S1 interface.

Figure 2:
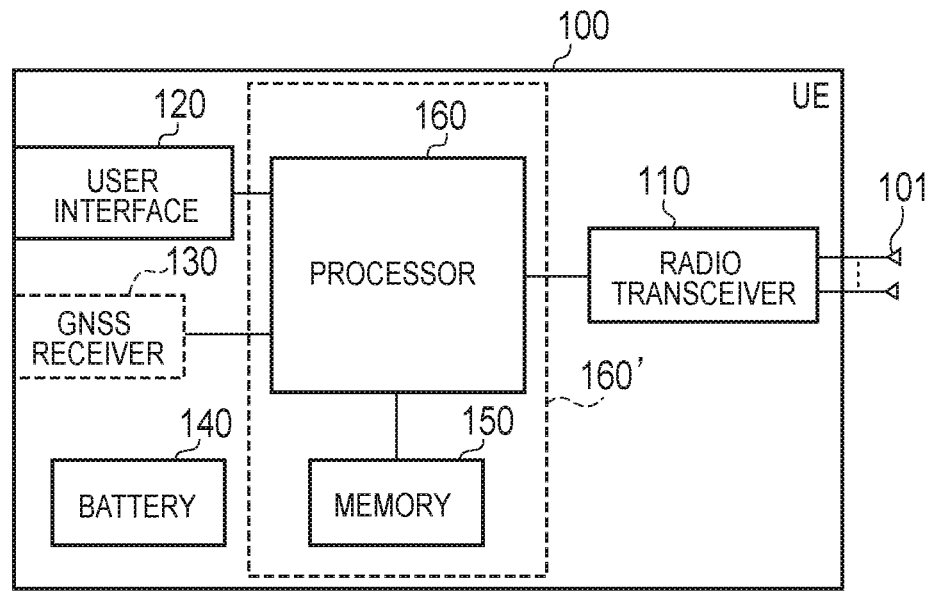
FIG. 2 is a block diagram of UE according to the first to sixth embodiments.

FIG. 2 is a block diagram of the UE 100. As illustrated in FIG. 2, the UE 100 is provided with a plurality of antennas 101, a radio transceiver 110, a user interface 120, a GNSS (Global Navigation Satellite System) receiver 130, a battery 140, a memory 150, and a processor 160. The memory 150 and the processor 160 constitute a control unit. The UE 100 does not necessarily have to be provided with the GNSS receiver 130. The memory 150 may be integrated with the processor 160 and the integrated memory 150 and the processor 160 (i.e., a chip set) may be used as a processor 160'.

The antenna 101 and the radio transceiver 110 are used for transmission and reception of radio signals. The radio transceiver 110 converts a baseband signal (a transmission signal) output from the processor 160 into a radio signal and transmits the radio signal from the antenna 101. The radio transceiver 110 converts the radio signal received by the antenna 101 into a baseband signal (a received signal) and outputs the baseband signal to the processor 160.

The user interface 120 is an interface with a user who possesses the UE 100 and is provided with, for example, a display, a microphone, speaker, and various buttons. The user interface 120 receives an operation from the user, and outputs a signal indicating the content of the operation to the processor 160. To obtain location information indicating a geographical position of the UE 100, the GNSS receiver 130 receives a GNSS signal and outputs the received signal to the processor 160. The battery 140 accumulates power that is supplied to each block of the UE 100.

The memory 150 stores a program executed by the processor 160, and information used for the process by the processor 160. The processor 160 includes a baseband processor that performs, for example, modulation/demodulation and encoding/decoding of the baseband signal, and a CPU (central processing unit) that executes the program stored in the memory 150 to perform various processes. The processor 160 may further include a codec that performs encoding/decoding of an audio/visual signals. The processor 160 performs various processes and various communication protocols described later.

Figure 3:
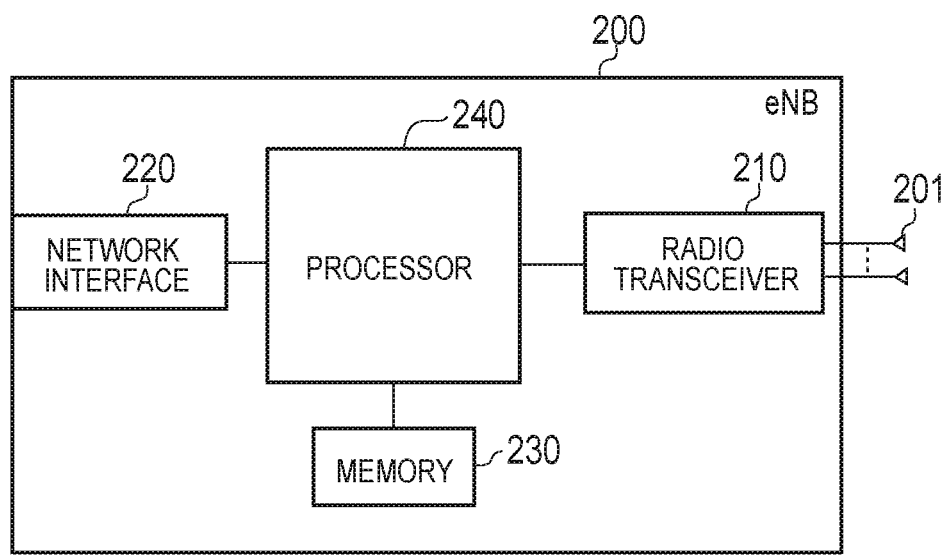
FIG. 3 is a block diagram of an eNB according to the first to sixth embodiments.

FIG. 3 is a block diagram of the eNB 200. As illustrated in FIG. 3, the eNB 200 is provided with a plurality of antennas 201, a radio transceiver 210, a network interface 220, a memory 230, and a processor 240. The memory 230 and the processor 240 constitute a control unit. The memory 230 may be integrated with the processor 240 and the integrated memory 230 and the processor 240 (i.e., a chip set) may be used as a processor.

The antenna 201 and the radio transceiver 210 are used for transmission and reception of radio signals. The radio transceiver 210 converts a baseband signal (a transmission signal) output from the processor 240 into a radio signal and transmits the radio signal from the antenna 201. The radio transceiver 210 converts the radio signal received by the antenna 201 into a baseband signal (a received signal) and outputs the baseband signal to the processor 240.

The network interface 220 is connected to a neighboring eNB 200 via an X2 interface, and connected to the MME/S-GW 300 via the S1 interface. The network interface 220 is used for the communication performed on the X2 interface and the communication performed on the S1 interface.

The memory 230 stores a program executed by the processor 240 and information used for the process by the processor 240. The processor 240 includes a baseband processor that performs, for example, modulation/demodulation and encoding/decoding of the baseband signal, and a CPU that executes the program stored in the memory 230 to perform various processes. The processor 240 performs various processes and various communication protocols described later.

Figure 4:
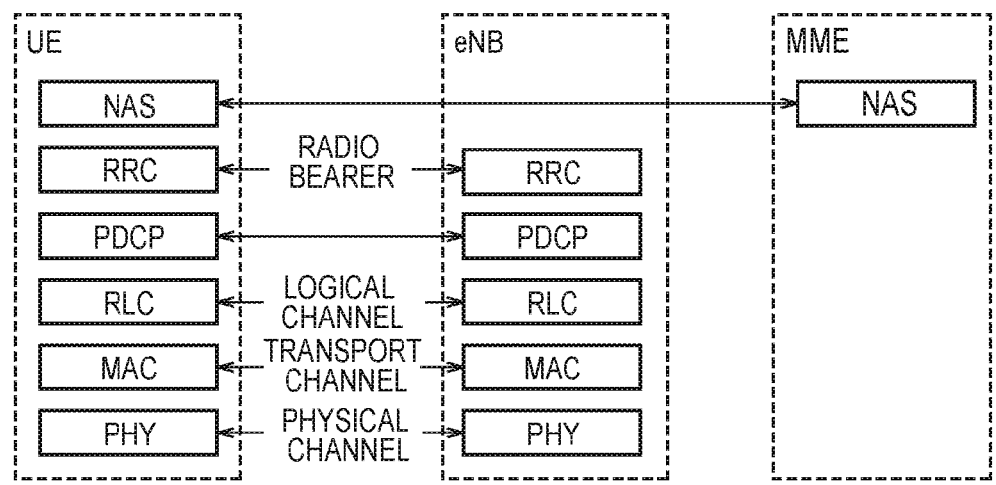
FIG. 4 is a protocol stack diagram of a radio interface according to the first to sixth embodiments.

FIG. 4 is a protocol stack diagram of a wireless interface in the LTE system. As illustrated in FIG. 4, a radio interface protocol is divided into first to third layers of an OSI reference model. The first layer is a physical (PHY) layer. The second layer includes an MAC (Medium Access Control) layer, an RLC (Radio Link Control) layer, and a PDCP (Packet Data Convergence Protocol) layer. The third layer includes an RRC (Radio Resource Control) layer.

The physical layer performs encoding/decoding, modulation/demodulation, antenna mapping/demapping, and resource mapping/demapping. Between the physical layer of the UE 100 and the physical layer of the eNB 200, the user data and the control signal are transmitted via a physical channel.

The MAC layer performs, for example, preferential control of data, a retransmission process by hybrid ARQ (HARQ), and a random access sequence at the time of establishment of the RRC connection. Between the MAC layer of the UE 100 and the MAC layer of the eNB 200, the user data and the control signal are transmitted via a transport channel The MAC layer of the eNB 200 includes a scheduler that determines a transport format (a transport block size, and a modulation/encoding method) of an uplink and a downlink, and determines an assignment resource block to the UE 100.

The RLC layer transmits data to the RLC layer on the reception side using the function of the MAC layer and the physical layer. Between the RLC layer of the UE 100 and the RLC layer of the eNB 200, the user data and the control signal are transmitted via a logical channel The PDCP layer performs header compression/decompression, and encoding/decoding.

The RRC layer is defined only by a control plane that deals with the control signal. Between the RRC layer of the UE 100 and the RRC layer of the eNB 200, control signals (RRC messages) for various configurations are transmitted. The RRC layer controls a logical channel, a transport channel, and a physical channel in accordance with establishment, reestablishment, and a release of a radio bearer. When a connection (RRC connection) is established between the RRC of the UE 100 and the RRC of the eNB 200, the UE 100 is in an RRC connected state, and when no connection is established, the UE 100 is in an RRC idle state.

An NAS (Non-Access Stratum) layer located above the RRC layer performs, for example, session management and mobility management.

(Dual Connectivity Scheme)

The LTE system according to the first embodiment supports the dual connectivity scheme. Introduction of the dual connectivity scheme is planned in Release 12 or thereafter. In the dual connectivity scheme, the UE 100 establishes connections with a plurality of eNBs 200 simultaneously. Since radio resources are assigned to the UE 100 from each eNB 200, an improvement in throughput is expected. The dual connectivity scheme may be referred also to as inter-eNB 200 carrier aggregation (inter-eNB CA).

Figure 5:
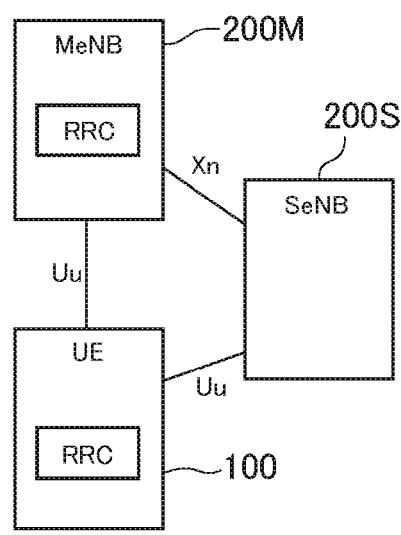
FIG. 5 is a diagram illustrating an overview of a dual connectivity scheme.

FIG. 5 is a diagram illustrating an overview of the dual connectivity scheme.

As illustrated in FIG. 5, in the dual connectivity scheme, only a master eNB (MeNB) 200M establishes an RRC connection with the UE 100 among a plurality of eNBs 200 that establish connections with the UE 100. On the other hand, a secondary eNB (SeNB) 200S among the plurality of eNBs 200 does not establish an RRC connection with the UE 100 but provides the UE 100 with additional radio resources. In other words, the MeNB 200M establishes not only a user plane connection but a control plane connection with the UE 100. On the other hand, the SeNB 200S establishes a user plane connection with the UE 100, and does not establish a control plane connection with the UE 100. An Xn interface is set between the MeNB 200M and the SeNB 200S. The Xn interface is an X2 interface or a new interface.

In the dual connectivity scheme, the UE 100 may perform carrier aggregation that uses N cells managed by the MeNB 200M and M cells managed by the SeNB 200S simultaneously. In the dual connectivity scheme, the maximum number of the serving cells of the UE 100, i.e., the maximum number of (N+M), is, for example, 5. Here, a group consisting of N cells managed by the MeNB 200M is referred to as a master cell group (MCG). A group consisting of M cells managed by the SeNB 200S is referred to as a secondary cell group (SCG). A special cell in which a PUCCH of the UE 100 is provided is configured in the SCG The special cell performs a part of a function of a primary cell (PCell) in the carrier aggregation.

FIGS. 6A to 7B are diagrams illustrating a configuration system of a transfer path (data path) of user data in the dual connectivity scheme. Mainly, there are two kinds of user plane architectures (UP architectures) that configure the transfer path (data path) of the user data in the dual connectivity scheme.

Figure 6A:
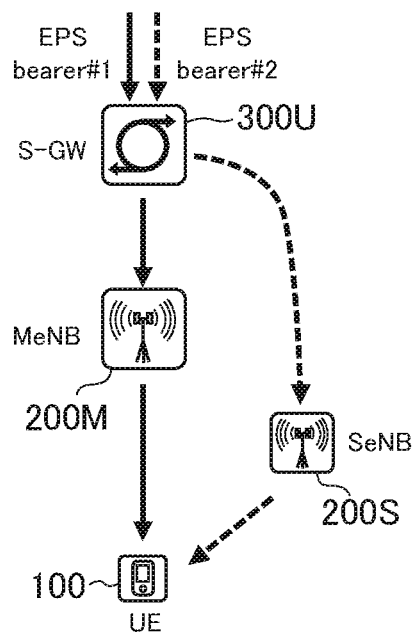
FIGS. 6A and 6B are diagrams illustrating a first UP architecture (a UP architecture "1A").
Figure 6B:
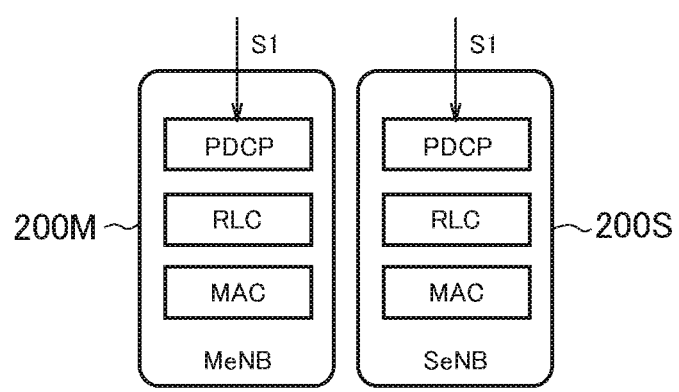

FIGS. 6A and 6B illustrate a first UP architecture (referred also to as a UP architecture "1A"). As illustrated in FIG. 6A, in the first UP architecture, an S1-U interface between the MeNB 200M and an S-GW 300U, and an S1-U interface between the SeNB 200S and the S-GW 300U are used. An EPS bearer #1 between the UE 100 and a P-GW goes via the S1-U interface between the MeNB 200M and the S-GW 300U. An EPS bearer #2 between the UE 100 and the P-GW goes via the S1-U interface between the SeNB 200S and the S-GW 300U. Thus, in the first UP architecture, the data path between the SeNB 200S and the S-GW 300U does not go via the MeNB 200M. As illustrated in FIG. 6B, each of the MeNB 200M and the SeNB 200S processes each layer of PDCP, RLC, and MAC. The EPS bearer #1 may be called as "MCG bearer", the EPS bearer #2 may be called as "SCG bearer", shown in FIG. 6A. The first UP architecture may be called as SCG bearer option.

Figure 7A:
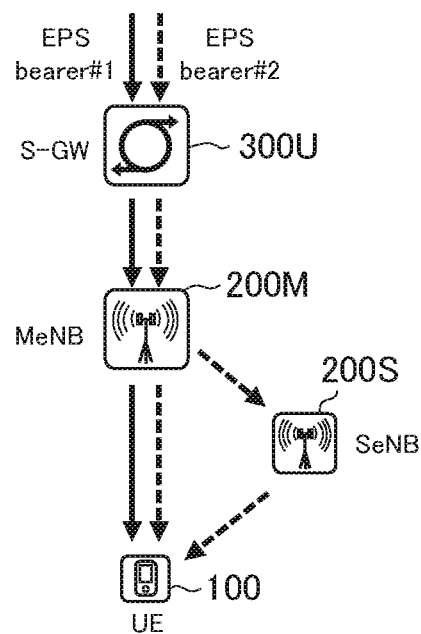
FIGS. 7A and 7B are diagrams illustrating a second UP architecture (a UP architecture "3C").
Figure 7B:
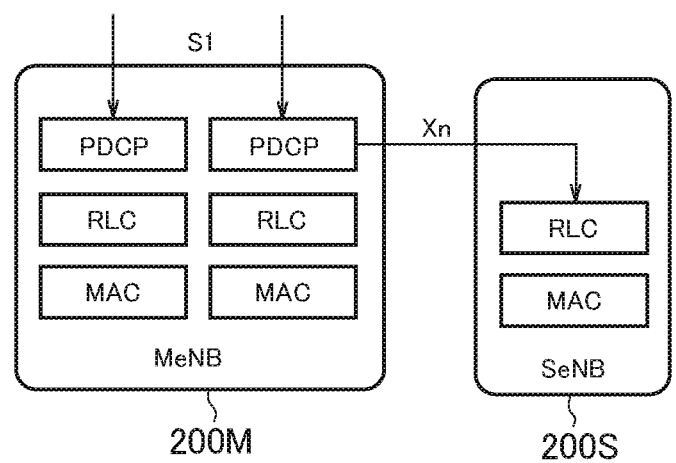

FIGS. 7A and 7B illustrate a second UP architecture (referred also to as a UP architecture "3C"). As illustrated in FIG. 7A, in the second UP architecture, the EPS bearer #2 between the UE 100 and the P-GW is split at the MeNB 200M. One split bearer terminates at the UE 100 via the SeNB 200S and another split bearer terminates at the UE 100 not via the SeNB 200S. Thus, in the second UP architecture, the data path between the SeNB 200S and the S-GW 300U goes via the MeNB 200M. As illustrated in FIG. 7B, regarding one split bearer of the EPS bearer #2, processing of each layer is performed by the PDCP of the MeNB 200M, and the RLC and the MAC of the SeNB 200S. Regarding the split bearer, the MeNB 200M may perform the processing until the RLC (or a part of the function of the RLC). The EPS bearer #1 may be called as "MCG bearer", the EPS bearer #2 may be called as "split bearer", shown in FIG. 7A. The second UP architecture may be called as split bearer option.

(Operation According to First Embodiment)
(1) Operation Scenario

In the first embodiment, a scenario in which the master cell is a macro cell and a secondary cell is a cell (small cell) having a coverage narrower than that of the macro cell is mainly considered. Here, the small cell is, for example, a picocell or a femtocell that has a coverage overlapping at least a part of the coverage of the macro cell. By configuring a cell of wider coverage as the master cell, a movement of the UE 100 in the RRC connected state can be followed, i.e., mobility is improved.

Figure 8:
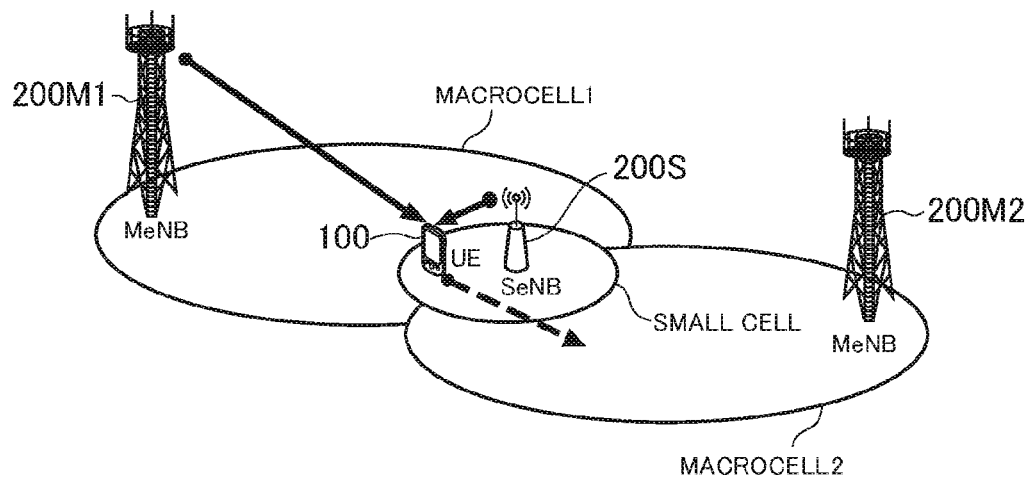
FIG. 8 is a diagram illustrating an operating environment according to the first embodiment.

FIG. 8 is a diagram illustrating an operating environment according to the first embodiment.

As illustrated in FIG. 8, the UE 100 is located in an overlapping area of the coverage of the macro cell 1 and the coverage of the small cell, and communicates in the dual connectivity scheme in combination of the macro cell 1 (MeNB 200M1) and the small cell (SeNB 200S). The small cell is located near a boundary of two macro cells 1 and 2. The UE 100 moves toward the macro cell 2 (MeNB 200M2). Therefore, handover of the UE 100 from the MeNB 200M1 (source) to the MeNB 200M2 (target) is needed. Hereafter, the MeNB 200M1 is referred to as a source MeNB (S-MeNB), and the MeNB 200M2 is referred to as a target MeNB (T-MeNB).

Figure 9:
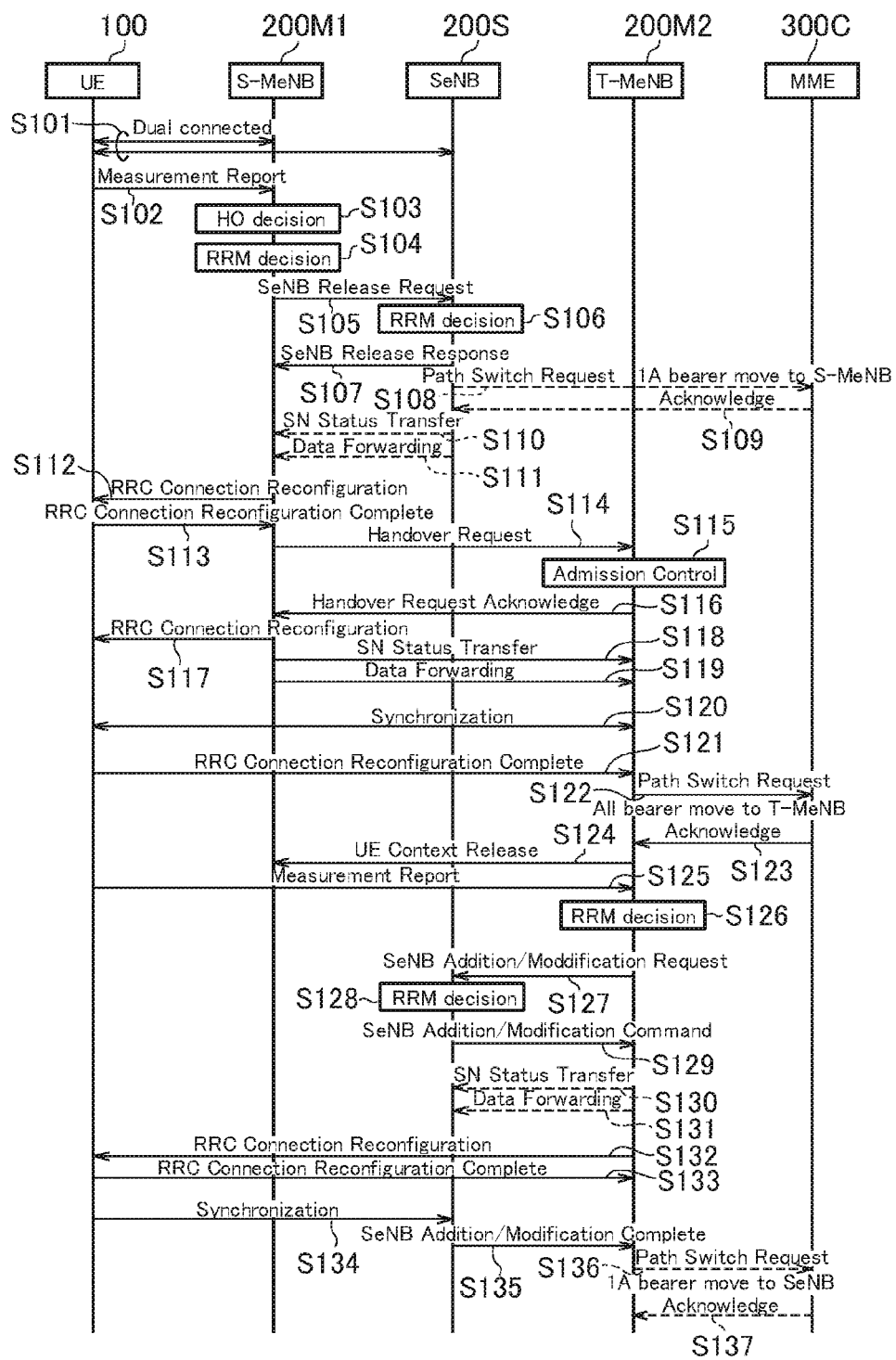
FIG. 9 is a sequence diagram illustrating a basic sequence.

FIG. 9 is a sequence diagram illustrating a basic sequence in the case of performing handover of the UE 100 from the S-MeNB 200M1 to the T-MeNB 200M2. In an initial state of FIG. 9, the UE 100 performs communication in the dual connectivity scheme with the S-MeNB 200M1 and SeNB 200S (S101).

As illustrated in FIG. 9, in the basic sequence, after the S-MeNB 200M1 determines handover of the UE 100 to the T-MeNB 200M2 (S103) on the basis of, for example, a measurement report received from the UE 100 (S102), the following three procedures are performed. First, a release procedure of the SeNB 200S (S104 to S113) is performed. Second, a handover procedure from the S-MeNB 200M1 to the T-MeNB 200M2 (S114 to S124) is performed. Third, an addition procedure of the SeNB 200S (S125 to S137) is performed.

In particular, in step S103, the S-MeNB 200M1 determines handover of the UE 100 to the T-MeNB 200M2. In step S104, the S-MeNB 200M1 determines a release of the SeNB resource corresponding to the UE 100. In step S105, the S-MeNB 200M1 transmits, to the SeNB 200S, a release request (SeNB Release Request) of the SeNB resource corresponding to the UE 100. In step S106, the SeNB 200S releases the SeNB resource in response to the release request. In step S107, the SeNB 200S transmits a response to the release request (SeNB Release Response) to the T-MeNB 200M2.

In the first UP architecture, in step S108, the SeNB 200S transmits, to the MME 300C, a switch request (Path Switch Request) for moving the bearer from the SeNB 200S to the S-MeNB 200M1. In step S109, the MME 300C transmits an acknowledgement to the switch request to the SeNB 200S. In steps S110 and S111, the SeNB 200S performs a data transfer process of the UE 100 to the S-MeNB 200M1.

In step S112, the S-MeNB 200M1 transmits, to the UE 100, an RRC reconfiguration message (RRC Connection Reconfiguration) for releasing the SeNB 200S. The UE 100 releases the configuration related to the SeNB 200S. In step S113, the UE 100 transmits, to the S-MeNB 200M1, a completion notification of RRC reconfiguration (RRC Connection Reconfiguration Complete).

In step S114, the S-MeNB 200M1 transmits a handover request to the T-MeNB 200M2. In step S115, the T-MeNB 200M2 determines whether to acknowledge the handover request. In step S116, the T-MeNB 200M2 transmits, to the S-MeNB 200M1, an acknowledgement to the handover request (Handover Request Acknowledge).

In step S117, the S-MeNB 200M1 transmits, to the UE 100, the RRC reconfiguration message for the handover. In steps S118 and S119, the SeNB 200S performs a data transfer process of the UE 100 to the T-MeNB 200M2.

In step S120, the UE 100 performs a random access to the T-MeNB 200M2 on the basis of the RRC reconfiguration message, and synchronizes with the T-MeNB 200M2. In step S121, the UE 100 transmits the completion notification of the RRC reconfiguration to the T-MeNB 200M2.

In step S122, the T-MeNB 200M2 transmits, to the MME 300C, the switch request for moving the data path from the S-MeNB 200M1 to the T-MeNB 200M2. In step S123, the MME 300C transmits an acknowledgement to the switch request to the SeNB 200S. In step S124, the T-MeNB 200M2 transmits the release request of a UE context to the S-MeNB 200M1.

In step S125, the UE 100 transmits a measurement report to the T-MeNB 200M2. In step S126, the T-MeNB 200M2 determines addition of the SeNB resource on the basis of, for example, the measurement report.

In step S127, the T-MeNB 200M2 transmits, to the SeNB 200S, an assignment request of the SeNB resource (SeNB Addition/Modification Request). In step S128, the SeNB 200S performs a radio resource configuration, when the SeNB 200S acknowledges the request. In step S129, the SeNB 200S transmits, to the T-MeNB 200M2, a report of the radio resource configuration (SeNB Addition/Modification Command)

In the first UP architecture, in steps S130 and S131, the T-MeNB 200M2 performs the data transfer process of the UE 100 to the SeNB 200S.

In step S132, the T-MeNB 200M2 transmits, to the UE 100, the RRC reconfiguration message for the addition of the SeNB 200S. The UE 100 starts application of the radio resource configuration of the SeNB 200S. In step S133, the UE 100 transmits, to the T-MeNB 200M2, a completion notification of the RRC reconfiguration (RRC Connection Reconfiguration Complete).

In step S134, the UE 100 performs a random access to the SeNB 200S on the basis of the RRC reconfiguration message, and synchronizes with the SeNB 200S. In step S135, the SeNB 200S that has detected synchronization with the UE 100 transmits, to the T-MeNB 200M2, a notification that the use of the radio resource configuration has been enabled (SeNB Addition/Modification Complete).

In the first UP architecture, in step S136, the T-MeNB 200M2 transmits, to the MME 300C, a switch request for moving the bearer from the S-MeNB 200M1 to the SeNB 200S. In step S137, the MME 300C transmits, to the SeNB 200S, an acknowledgement to the switch request.

Thus, in the basic sequence, an RRC reconfiguration (RRC Connection Reconfiguration) to the UE 100 is performed in each of the release procedure of the SeNB 200S, the handover procedure, and the addition procedure of the SeNB 200S. First, in the release procedure of the SeNB 200S, the RRC reconfiguration for the release of the SeNB 200S is performed (S112). Second, in the handover procedure from the S-MeNB 200M1 to the T-MeNB 200M2, the RRC reconfiguration for the handover is performed (S117). Third, in the addition procedure of the SeNB 200S, the RRC reconfiguration for the addition of the SeNB 200S is performed (S132). Thus, it is considered that the RRC reconfiguration is performed three times in the handover between MeNBs 200M in the dual connectivity scheme. Therefore, signaling in a radio segment increases and, at the same time, RLF-HOF (handover failure) increases as processing time related to the handover increases.

Further, signaling with the core network may occur in each of the release procedure of the SeNB 200S, the handover procedure, and the addition procedure of the SeNB 200S. First, in the release procedure of the SeNB 200S, in the first UP architecture described above, signaling for moving the bearer from the SeNB 200S to the S-MeNB 200M1 (S108, S109) occurs. Second, in the handover procedure from the S-MeNB 200M1 to the T-MeNB 200M2, signaling for switching the data path from the S-MeNB 200M1 to the T-MeNB 200M2 (S122, S123) occurs. Third, in the addition procedure of the SeNB 200S, in the first UP architecture, signaling for moving the bearer from the S-MeNB 200M1 to the SeNB 200S (S136, S137) occurs. Thus, it is considered that signaling with the core network occurs three times at the maximum in the handover between MeNBs 200M in the dual connectivity scheme. Therefore, an increase in the signaling in the network segment becomes a problem.

In the first embodiment, the increase in signaling described above can be controlled by improving the sequence of the handover between MeNBs 200M in the dual connectivity scheme. An improved handover sequence is described below.

(2) Operation Pattern 1

Figure 10:
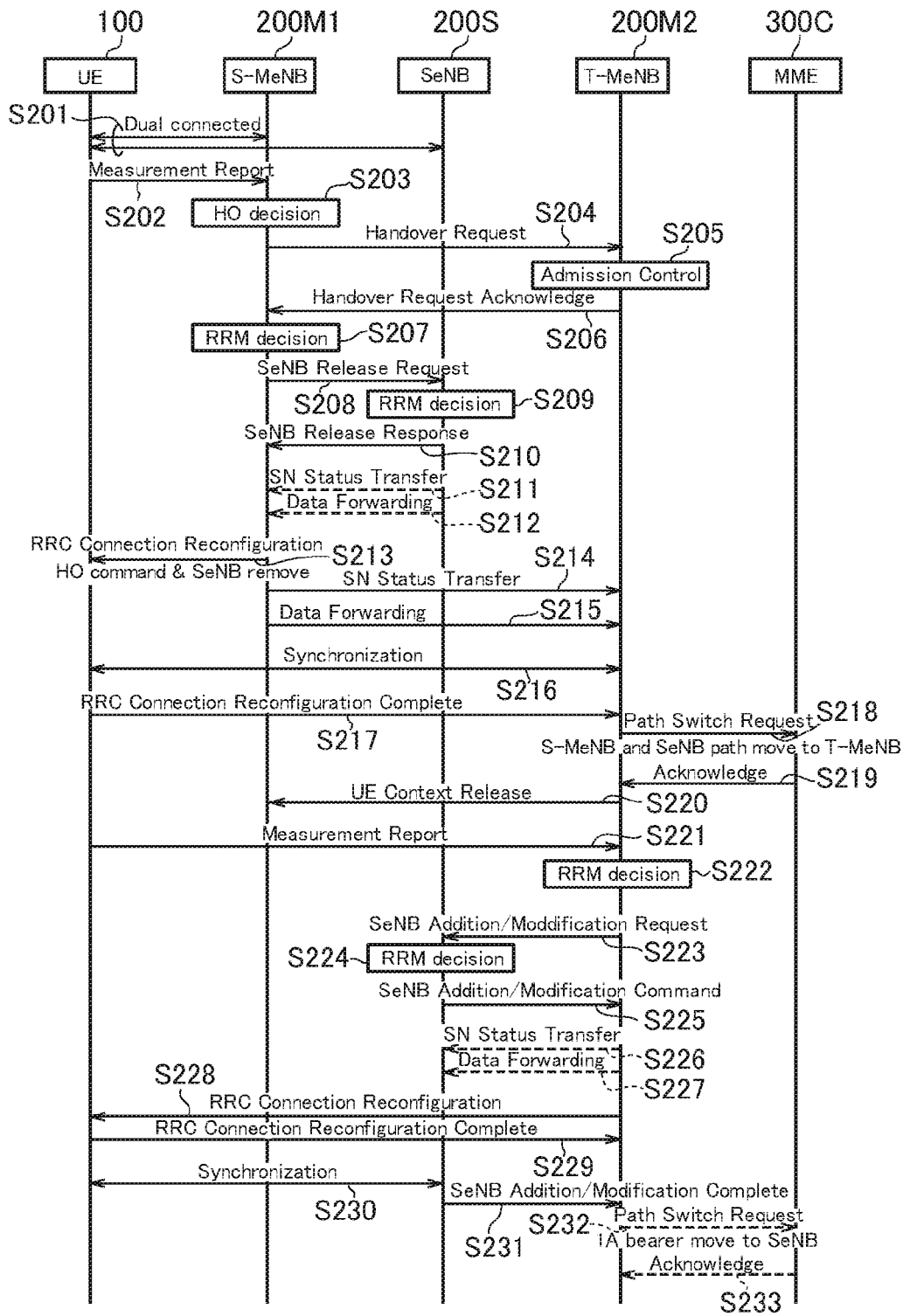
FIG. 10 is a sequence diagram illustrating an operation pattern 1 according to the first embodiment.

FIG. 10 is a sequence diagram illustrating an operation pattern 1 according to the first embodiment. Hereinafter, differences with the basic sequence are described mainly. In an initial state of FIG. 11, the UE 100 performs communication in the dual connectivity scheme with the S-MeNB 200M1 and SeNB 200S (S201).

As illustrated in FIG. 10, in step S203, the S-MeNB 200M1 determines handover of the UE 100 to the T-MeNB 200M2 on the basis of, for example, the measurement report received from the UE 100 (S202). In the operation pattern 1, the S-MeNB 200M1 may determine whether to release the connection between the SeNB 200S and the UE 100 at the time of determination of the handover.

In step S204, the S-MeNB 200M1 transmits a handover request to the T-MeNB 200M2. In step S205, the T-MeNB 200M2 determines whether to acknowledge the handover request. In step S206, the T-MeNB 200M2 transmits an acknowledgement to the handover request (Handover Request Acknowledge) to the S-MeNB 200M1. The T-MeNB 200M2 includes, in the handover acknowledgement, an RRC container for which the SeNB configuration is not performed. The S-MeNB 200M1 may determine whether to release the connection between the SeNB 200S and the UE 100 at the time of reception of the handover acknowledgement from the T-MeNB 200M2.

Next, the S-MeNB 200M1 and the SeNB 200S perform the release procedure of the SeNB 200S (steps S207 to S212). The release procedure is the same as that of the basic sequence.

In step S213, the S-MeNB 200M1 transmits, to the UE 100, the RRC reconfiguration message including a handover command for instructing handover.

In the operation pattern 1, the S-MeNB 200M1 transmits, to the UE 100, information for configuring the release of the connection between the SeNB 200S and the UE 100 (SeNB remove) with the handover command. The SeNB remove corresponds to secondary base station information about the configuration of the SeNB 200S. It is desirable that the S-MeNB 200M1 transmits, to the UE 100, one RRC reconfiguration message including the handover command and the SeNB remove. Therefore, since the RRC reconfiguration message only for the release of the SeNB 200S becomes unnecessary, the RRC reconfiguration can be reduced by once as compared with the basic sequence. The UE 100 that has received SeNB information with the handover command releases the connection with the SeNB 200S in response to the SeNB remove, synchronizes with the T-MeNB 200M2 in response to the handover command (S216), and establishes a new RRC connection (S217).

In the operation pattern 1, the T-MeNB 200M2 transmits, to the MME 300C, a path switch request (S218) for switching the data path between the S-MeNB 200M1 and the S-GW 300U and the data path (bearer) between the SeNB 200S and the S-GW 300U to the T-MeNB 200M2 collectively. It is desirable that information about the bearer of the S-MeNB 200M1 is included in the handover request (S204) described above or other messages. Thus, the T-MeNB 200M2 can specify a bearer to be switched using the bearer information included in the handover request.

In response to the path switch request, the MME 300C performs path switching for switching the data path between the S-MeNB 200M1 and the S-GW 300U, and the data path (bearer) between the SeNB 200S and the S-GW 300U to the T-MeNB 200M2 collectively. Thus, signaling for moving the bearer from the SeNB 200S to the S-MeNB 200M1 in the first UP architecture becomes unnecessary.

The addition procedure of the SeNB 200S (steps 5211 to 5233) is the same as that of the basic sequence.

(3) Operation Pattern 2

Figure 11:
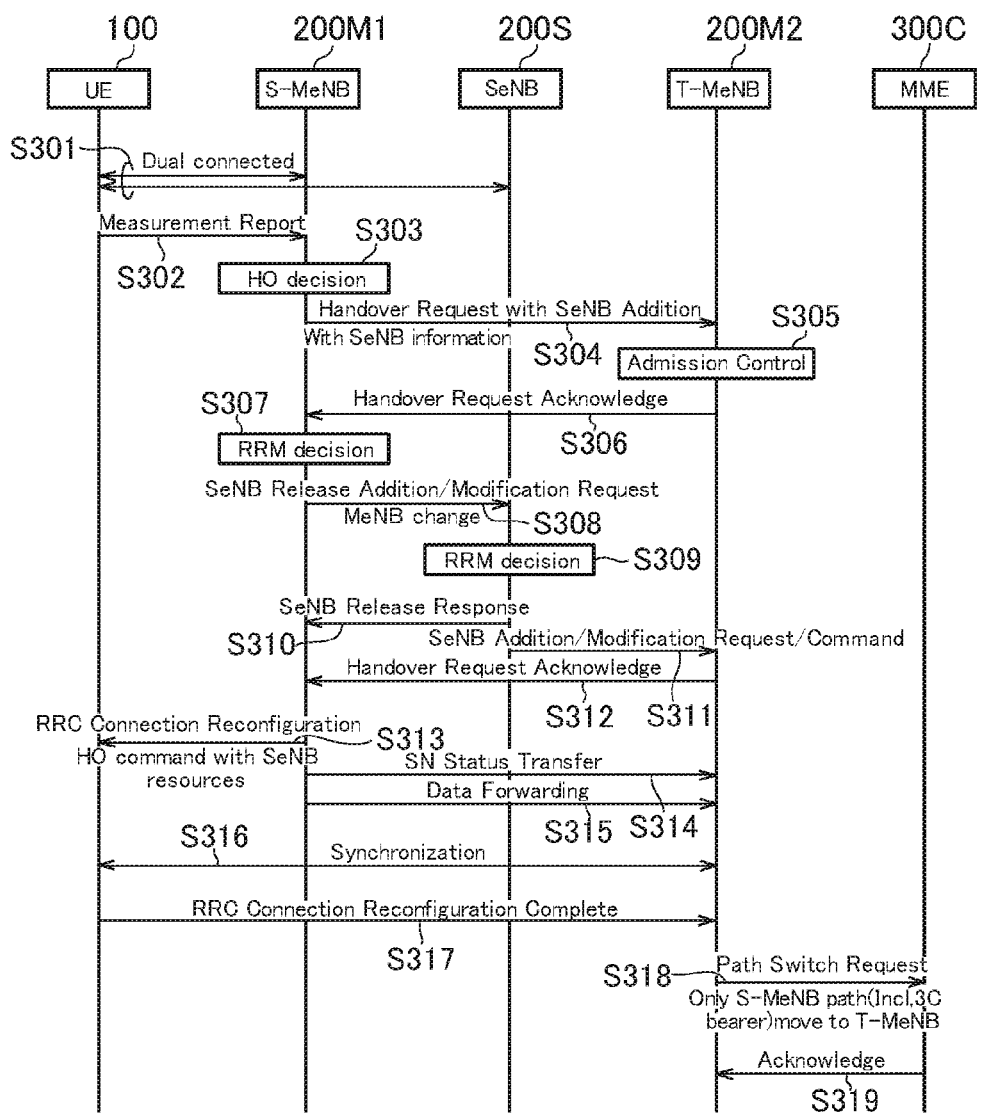
FIG. 11 is a sequence diagram illustrating an operation pattern 2 according to the first embodiment.

FIG. 11 is a sequence diagram illustrating an operation pattern 2 according to the first embodiment. In an initial state of FIG. 11, the UE 100 performs communication in the dual connectivity scheme with the S-MeNB 200M1 and the SeNB 200S (S301).

As illustrated in FIG. 11, in step S303, the S-MeNB 200M1 determines handover of the UE 100 to the T-MeNB 200M2 on the basis of, for example, the measurement report received from the UE 100 (S302). The S-MeNB 200M1 determines whether to release the connection between the SeNB 200S and the UE 100 at the time of determination of the handover. In the operation pattern 2, the S-MeNB 200M1 can determine handover while maintaining the SeNB 200S (DC HO: Dual Connectivity HandOver). The next operation is performed after determining handover while maintaining the SeNB 200S.

In step S304, the S-MeNB 200M1 transmits a handover request to the T-MeNB 200M2. At that time, the S-MeNB 200M1 includes, in the handover request, information indicating that handover is performed while maintaining the connection between the SeNB 200S and the UE 100 (SeNB Information). The SeNB Information includes information about the SeNB 200S (e.g., an eNB ID and a cell ID). The SeNB Information may also include an element included in SeNB Addition/Modification (e.g., UE capabilities and the radio resource configuration of the UE). The S-MeNB 200M1 may hold the RRC container received from the SeNB 200S at the time of SeNB Addition before the present sequence, and may include the RRC container in the handover request. The RRC container may be used in, for example, step S311 described later.

In step S305, the T-MeNB 200M2 determines to acknowledge the handover request. Here, when the information related to SeNB Addition is included in the handover request (i.e., the information indicating DC HO), the T-MeNB 200M2 may make a determination including acknowledgement of the SeNB Addition.

If acknowledgment (acceptance) is possible, in step S306, the T-MeNB 200M2 transmits the handover acknowledgement to the S-MeNB 200M1. The handover acknowledgement in step S306 may be a normal handover acknowledgement, and the handover acknowledgement may be omitted when the handover acknowledgement is transmitted in step S312 described later. Alternatively, the handover acknowledgement in step S306 may be a simplified normal handover acknowledgement (e.g., a flag indicating that HO is acknowledged temporarily). Alternatively, the handover acknowledgement in step S306 may include information indicating that "since the resource is insufficient, the HO requires addition of the SeNB resource" (which may be used in step S307 described later) may be included.

In step S307, the S-MeNB 200M1 that has received the handover acknowledgement determines to maintain the SeNB resource. In step S308, the S-MeNB 200M1 transmits, to SeNB 200S, a request for modifying and switching the MeNB (SeNB Release Addition/Modification Request). The S-MeNB 200M1 includes information indicating that the SeNB switches to the T-MeNB 200M2 (MeNB change) in the request. The MeNB change includes information about the T-MeNB 200M2 (e.g., an eNB ID and a cell). When SeNB related configuration information is included in the handover request in step S304 (i.e., it is already a state in which the T-MeNB can configure the SeNB), step S308 may be mere Release (however, information related to MeNB change is transmitted).

In step S309, the SeNB 200S releases and changes the radio resource when the SeNB 200S acknowledges the request from the S-MeNB 200M1. In step S310, the SeNB 200S transmits, to the S-MeNB 200M1, a response to the release and change request (SeNB Release Response).

In step S311, on the basis of the MeNB change received from the S-MeNB 200M1, the SeNB 200S transmits a notification of the radio resource configuration (SeNB Addition/Modification Request/Command) to the T-MeNB 200M2. When the SeNB related configuration information is included in the handover request in step S304 (i.e., it is already a state in which the T-MeNB can configure the SeNB) the notification in step S311 may be in reverse direction or may be omitted.

In step S312, the T-MeNB 200M2 transmits, to the S-MeNB 200M1, a handover acknowledgement including the radio resource configuration of the SeNB (SeNB resource). Alternatively, the T-MeNB 200M2 may include the SeNB resource configuration in other messages, and transmit to the S-MeNB 200M1.

In step S313, the S-MeNB 200M1 transmits, to the UE 100, the RRC reconfiguration message including the SeNB resource configuration from the T-MeNB 200M2, and the handover command. The SeNB resource configuration corresponds to the information for configuring the maintenance of the connection between the SeNB 200S and the UE 100.

The UE 100 starts application of the SeNB resource configuration. Here, since the UE 100 is in synchronization with the SeNB 200S, the random access (synchronization) with the SeNB 200S may be omitted. Further, information indicating omission of the random access (synchronization) may be included in the RRC reconfiguration message.

In steps S314 and S315, the SeNB 200S performs a data transfer process of the UE 100 to the T-MeNB 200M2.

In step S316, the UE 100 performs a random access to the T-MeNB 200M2 on the basis of the RRC reconfiguration message, and synchronizes with the T-MeNB 200M2. In step S317, the UE 100 transmits the completion notification of the RRC reconfiguration to the T-MeNB 200M2.

In step S318, the T-MeNB 200M2 transmits, to the MME 300C, the path switch request for switching the data path between the S-MeNB 200M1 and the S-GW 300U to the T-MeNB 200M2. In the operation pattern 2, since the SeNB 200S is maintained, the bearer switching of the SeNB 200S does not occur even in the first UP architecture.

Thus, in the operation pattern 2, signaling can be reduced significantly by performing the handover between the MeNBs 200M while maintaining the SeNB 200S as compared with the basic sequence.

In the operation pattern 2, the handover acknowledgement is transmitted from the T-MeNB 200M2 to the S-MeNB 200M1 twice (S306, S312), but the handover acknowledgement may be transmitted only once (S312).

[Second Embodiment]

Hereinafter, regarding a second embodiment, differences from the first embodiment are described mainly.

(1) Operation Scenario

Figure 12:
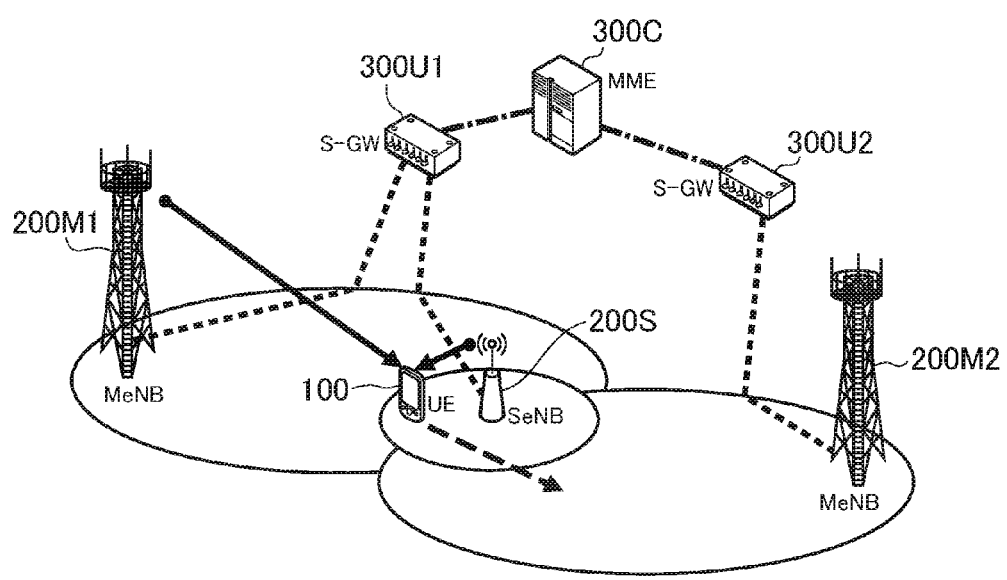
FIG. 12 is a diagram illustrating an operating scenario according to the second embodiment.

FIG. 12 is a diagram illustrating an operating scenario according to the second embodiment.

Figure 16:
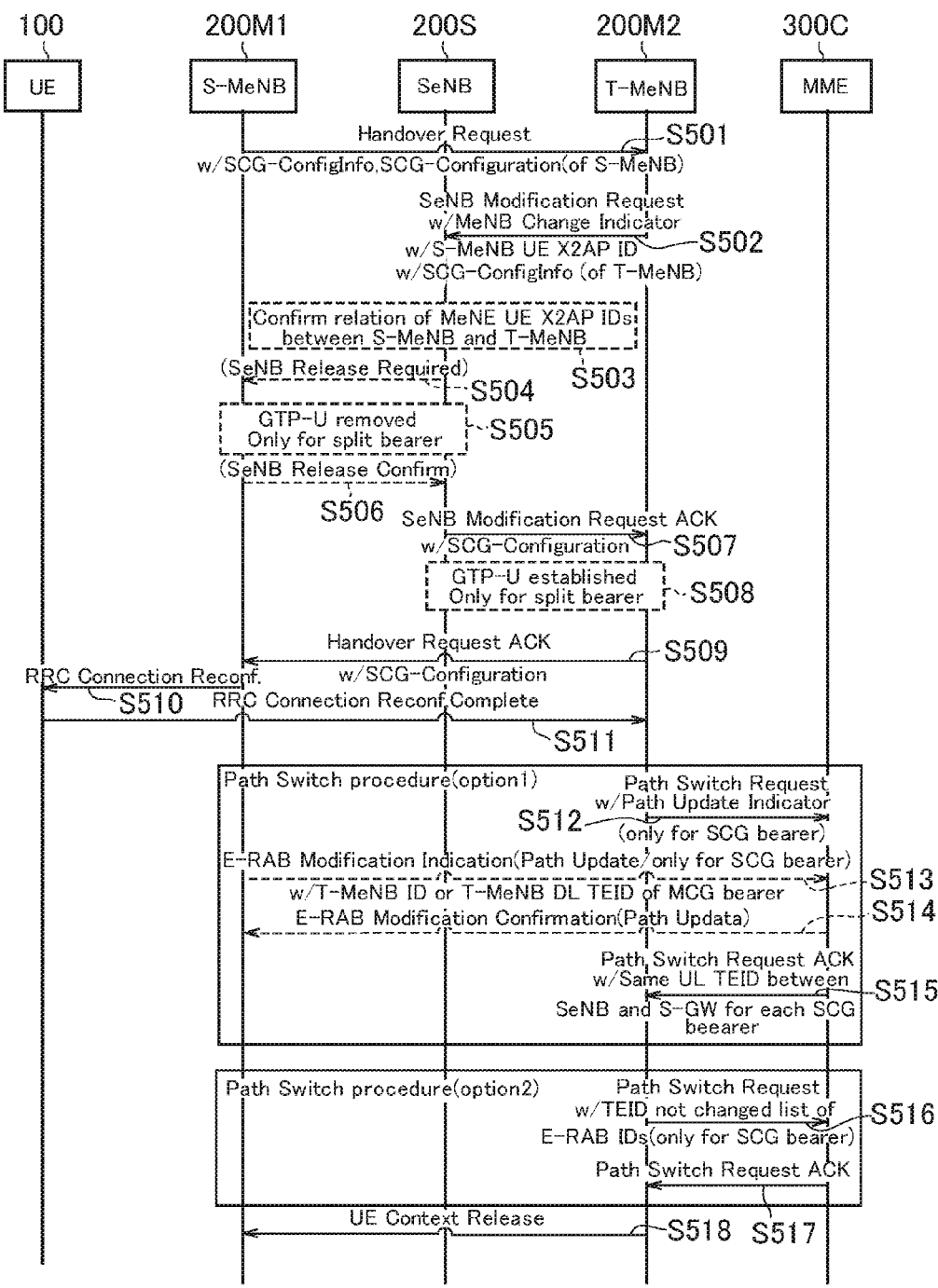
FIG. 16 is a sequence diagram illustrating an inter-MeNB handover procedure according to a third embodiment.

As illustrated in FIG. 12, in the operation scenario according to the second embodiment, a configuration of an EPC 20 in the operation scenario according to the first embodiment is also considered. In the example of FIG. 16, the MeNB 200M1 and the SeNB 200S are contained in the same S-GW 300U1, and the MeNB 200M1 is contained in a different S-GW 300U2. That is, each of the MeNB 200M1 and the SeNB 200S has an S1 interface between itself and the S-GW 300U1. The MeNB 200M2 has an S1 interface between itself and the S-GW 300U2.

In this scenario, the first UP architecture is inapplicable to the SeNB 200S and the MeNB 200M2, but the second UP architecture is applicable to the SeNB 200S and the MeNB 200M2. In this scenario, on the presumption that the first UP architecture is applied, enhanced handover control in which handover between the MeNBs 200M is performed while the SeNB 200S is maintained as, for example, in the operation pattern 2 according to the first embodiment cannot be performed.

(2) Operation According to Second Embodiment

In the second embodiment, a node that performs handover determination (HO decision) or handover acknowledgment control (Admission Control) in handover control according to the first embodiment makes a determination related to the dual connection scheme on the basis of whether the S-GW 300U that accommodates the MeNB 200M and the S-GW 300U that accommodates SeNB 200S coincide with each other. The node is a communication control apparatus, such as the MeNB 200M or the SeNB 200S. For example, the node determines not to apply the first UP architecture when the S-GW 300U that accommodates the MeNB 200M and the S-GW 300U that accommodates the SeNB 200S do not coincide with each other.

Further, as illustrated in FIG. 12, with reference to the first embodiment, on the basis of whether the second UP architecture can be applied, the node determines whether to perform handover after releasing the connection between the SeNB 200S and the UE 100 (basic sequence), or perform handover while maintaining the connection between the SeNB 200S and the UE 100 (enhanced handover). Alternatively, on the basis of whether the S-GW 300U that accommodates the MeNB 200M2 and the S-GW 300U that accommodates the SeNB 200S coincide with each other, the node determines whether to perform handover after releasing the connection between the SeNB 200S and the UE 100 (basic sequence), or perform handover while maintaining the connection between the SeNB 200S and the UE 100 (enhanced handover).

For the MeNB 200M or the SeNB 200S to make such a determination, each eNB 200 needs to know the S-GW 300U that accommodates other eNBs 200.

Therefore, in the second embodiment, the MeNB 200M or the SeNB 200S transmits, to a neighboring eNB, identification information of the S-GW 300U that accommodates the own eNB. Here, the S-GW 300U that accommodates the own eNB is the S-GW 300U that has an S1 interface between the S-GW 300U and its own eNB. The identification information of the S-GW 300U is, for example, an S-TEID (S-GW ID) or an S-GW IP address.

Figure 13:
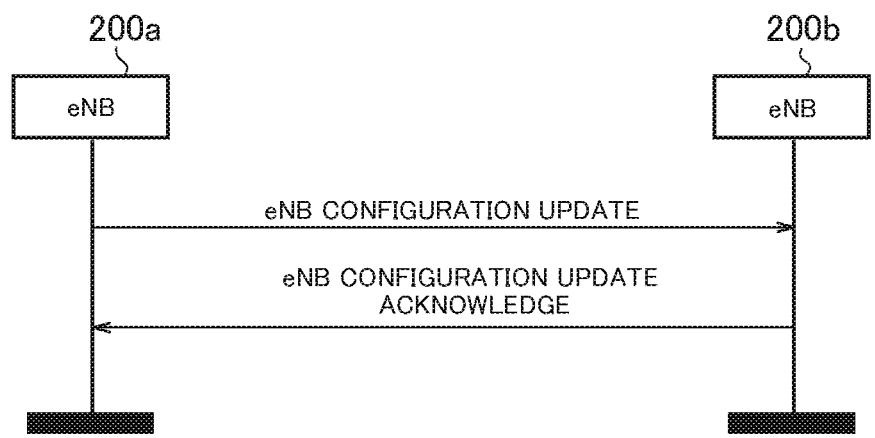
FIG. 13 is a diagram illustrating a first operation for transmitting and receiving the S-GW identification information between eNBs according to the second embodiment.

FIG. 13 is a diagram illustrating a first operation for transmitting and receiving the identification information of the S-GW 300U between the eNBs 200. As illustrated in FIG. 13, the eNB 200a transmits, to the eNB 200b, identification information of the S-GW 300U containing the eNB 200a included in an eNB Configuration Update message. The eNB Configuration Update message is a message for reporting a configuration update of the eNB 200. An X2 Setup message may be used instead of eNB Configuration Update message. The X2 Setup message is a message for setting up an X2 interface. For example, as shown in Table 1, the identification information of the S-GW 300U is included in "Served Cell Information" of the eNB Configuration Update message.

TABLE 1

| IE/Group Name | Presence | IE type and reference | Semantics description |
|---|---|---|---|
| PCI | M | INTEGER (0 . . . 503, . . .) | Physical Cell ID |
| Cell ID | M | ECGI 9.2.14 | |

TABLE 1-continued

| IE/Group Name | Presence | IE type and reference | Semantics description |
|---|---|---|---|
| TAC | M | OCTET STRING(2) | Tracking Area Code |
| S-GW ID | O | OCTET STRING(16) | S-TEID(S-GW ID) or S-GW IP address |
| [. . .] | | | |

Figure 14:
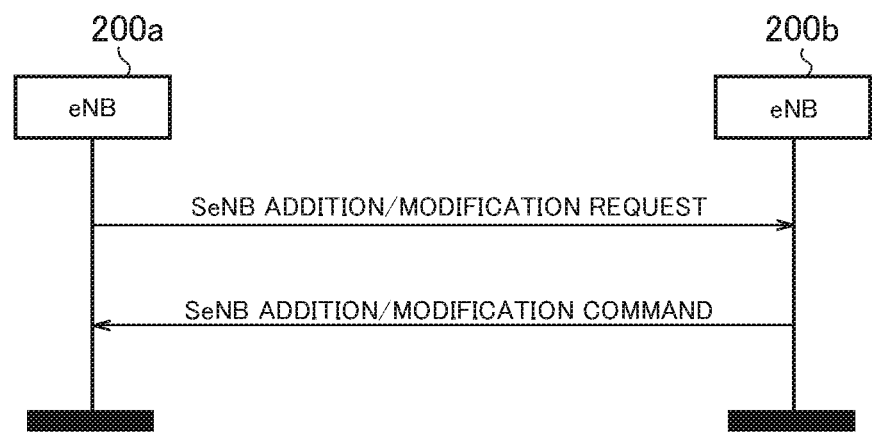
FIG. 14 is a diagram illustrating a second operation for transmitting and receiving the S-GW identification information between eNBs according to the second embodiment.

FIG. 14 is a diagram illustrating a second operation for transmitting and receiving identification information of the S-GW 300U between the eNBs 200. As illustrated in FIG. 14 and Table 2, the eNB 200a transmits, to the eNB 200b, the identification information of the S-GW 300U containing the eNB 200a included in the SeNB Addition/Modification message described above.

TABLE 2

| IE/Group Name | Presence | IE type and reference | Semantics description | Criticality | Assigned Criticality |
|---|---|---|---|---|---|
| Message Type | M | 9.2.13 | | YES | reject |
| Old eNB UE X2AP ID | M | eNB UE X2AP ID 9.2.24 | Allocated at the source eNB | YES | reject |
| Cause | M | 9.2.6 | | YES | ignore |
| Target Cell ID | M | ECGI 9.2.14 | | YES | reject |
| GUMMEI | M | 9.2.16 | | YES | reject |
| S-GW ID | O | S-GW ID | S1-TEID(S-GW ID) or IP address | YES | Ignore |
| [. . .] | | | | | |

Figure 15:
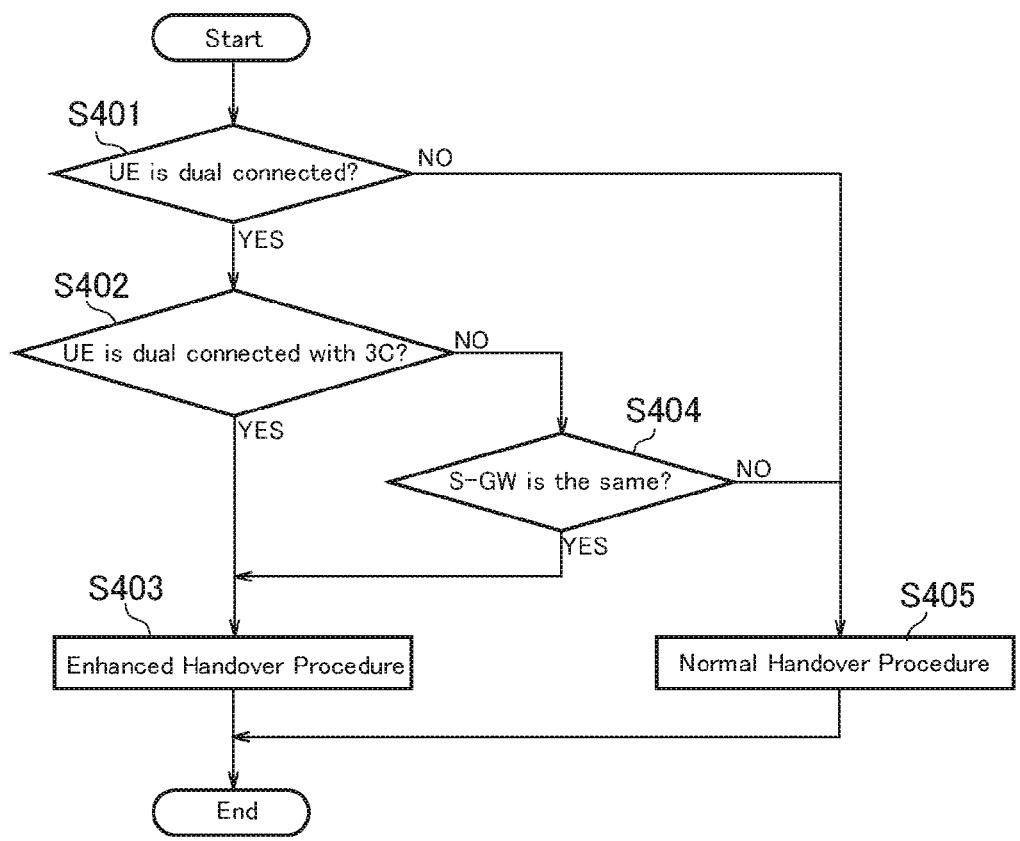
FIG. 15 is a flow diagram illustrating an operation according to the second embodiment.

FIG. 15 is a flowchart illustrating an operation according to the second embodiment.

As illustrated in FIG. 15, in step S401, the node (the MeNB 200M or the SeNB 200S) determines whether the UE 100 communicates in the dual connection scheme. When the normal communication is performed (step S401: NO), it is determined in step S405 to perform normal handover.

When the communication is performed in the dual connection scheme (step S401: YES), the node determines in step S402 whether the UE 100 communicates in the second UP architecture (UP architecture "3C"). When the communication is performed in the second UP architecture (step S402: YES), the node determines in step S403 that enhanced handover according to the first embodiment is performed.

On the other hand, when the UE 100 does not communicate in the second UP architecture, i.e., the UE 100 communicates in the first UP architecture (UP architecture "1A") (step S402: NO), the node determines in step S404 as to coincidence/non-coincidence of the S-GWs 300U described above. When it is determined that the S-GWs 300U coincide with each other (step S404: YES), the node determines in step S403 to perform enhanced handover according to the first embodiment. On the other hand, if the S-GWs 300U do not coincide with each other (step S404: NO), the node determines in step S405 to perform normal handover.

[Third Embodiment]

The third embodiment to the seventh embodiment are such that part of the operation pattern 2 of the first embodiment is modified.

The third embodiment will be described below mainly in the differences from the first embodiment and the second embodiment. The basic handover procedures according to the third embodiment to the seventh embodiment are the same as the operation pattern 2 of the first embodiment.

Specifically, a communication control method according to the third embodiment is directed for a LTE system for supporting dual connectivity communication using the MeNB 200M (master base station) for establishing RRC connection with the UE 100 and the SeNB 200S (secondary base station) for providing additional radio resources to the UE 100. The communication control method comprises an inter-MeNB handover procedure for handing over the UE 100 from the S-MeNB 200M1 (source master base station) to the T-MeNB 200M2 (target master base station) without releasing connection between the UE 100 and the SeNB 200S.

FIG. 16 is a sequence diagram illustrating the inter-MeNB handover procedure according to the third embodiment. In the initial state in FIG. 16, the UE 100 makes dual connectivity communication with the S-MeNB 200M1 and the SeNB 200S. The operations in dashed lines in FIG. 16 indicate non-essential operations.

As illustrated in FIG. 16, in step S501, the S-MeNB 200M1 transmits a handover request ("Handover Request") message for requesting a handover of the UE 100, to the T-MeNB 200M2.

The "Handover Request" message includes the information indicating the inter-MeNB handover procedure ("MeNB Change Indicator"). "MeNB Change Indicator" indicates inter-MeNB handover, and indicates a request for an operation related to the SeNB 200S, to the T-MeNB 200M2. The "Handover Request" message may include "S-MeNB UE X2AP ID." The "S-MeNB UE X2AP ID" is X2AP ID of the S-MeNB 200M1. The "S-MeNB UE X2AP ID" may implicitly serve as "MeNB Change Indicator." The "Handover Request" message includes the configuration information (SCG configuration information) held by the S-MeNB 200M1 in association with the SeNB 200S. Specifically, the "Handover Request" message includes "SCG-Configinfo" and "SCG-Configuration." The "SCG-Configinfo" is the configuration information on the current configuration of MeNB (MeNB-related configuration information). Here, "SCG-Configinfo" is the configuration information of the S-MeNB 200M1. The "SCG-Configuration" is the configuration information on the current configuration of SeNB (SeNB-related configuration information).

In step S502, the T-MeNB 200M2 transmits a modification request ("SeNB Modification Request") message for requesting to modify the configuration in the SeNB 200S to the SeNB 200S in response to receipt of the "Handover Request" message. The "SeNB Modification Request" message includes "MeNB Change Indicator" and "S-MeNB UE X2AP ID." Further, the "SeNB Modification Request" message includes "SCG-Configinfo." Here, "SCG-Configinfo" is the configuration information of the T-MeNB 200M2, and is used by the SeNB 200S to determine "SCG-Configuration."

In step S503, the SeNB 200S collates and associates "S-MeNB UE X2AP ID" included in the "SeNB Modification Request" message with "UE X2AP ID" on the T-MeNB 200M2 side in response to receipt of the "SeNB Modification Request" message.

In step S504, the SeNB 200S transmits a SeNB release request ("SeNB Release Required") message to the S-MeNB 200M1. In the case of split bearer option, in step S505, the S-MeNB 200M1 and the SeNB 200S remove the GTP-U tunnel for split bearer. In step S506, the S-MeNB 200M1 transmits a SeNB release notification ("SeNB Release Confirm") message to the SeNB 200S.

In step S507, the SeNB 200S transmits a modification request acknowledge ("SeNB Modification Request ACK") message for the "SeNB Modification Request" message to the T-MeNB 200M2. The "SeNB Modification Request ACK" message includes the configuration information of the SeNB 200S (SCG configuration information). In the case of split bearer option, in step S508, the SeNB 200S and the T-MeNB 200M2 establish the GTP-U tunnel for split bearer.

In step S508, the T-MeNB 200M2 transmits handover acknowledge ("Handover Request Acknowledge") for the "Handover Request" message to the S-MeNB 200M1 in response to receipt of the "SeNB Modification Request ACK" message. The "Handover Request Acknowledge" message includes the information (SCG configuration information and MCG configuration information) required by the S-MeNB 200M1 to perform RRC reconfiguration (RRC Connection Reconfiguration) described below.

In step S510, the S-MeNB 200M1 transmits a "RRC Connection Reconfiguration" message to the UE 100 in response to receipt of the "Handover Request Acknowledge" message. The "RRC Connection Reconfiguration" message corresponds to a handover instruction to hand over to the T-MeNB 200M2, and includes the SCG configuration information and the MCG configuration information. It is noted herein that the SeNB 200S is not released.

In step S511, the UE 100 performs the processing of establishing RRC connection with the T-MeNB 200M2. In this way, the UE 100 performs handover from the S-MeNB 200M1 to the T-MeNB 200M2 while keeping the SeNB 200S.

The T-MeNB 200M2 then makes a path switch request to the MME 300C. Herein, in the case of SCG bearer option, a first method (option 1) and a second method (option 2) for switching a path while keeping the endpoint ID (or UL-TE ID) on the S-GW 300U side for the tunneling between the SeNB 200S and the S-GW 300U will be described.

In the first method, in step S512, the T-MeNB 200M2 transmits "Path Switch Request" to the MME 300C. "Path Switch Request" includes the information (indicator) on handover during Dual Connectivity, or E-RAB ID keeping the endpoint ID and/or E-RAB ID which may not keep it, or the like. The MME 300C may control the S-GW 300U not to perform data transfer before a path is updated for E-RAB ID. In step S513, the S-MeNB 200M1 transmits "E-RAB Modification indication" to the MME 300C. In step S514, the MME 300C confirms the matching with the E-RAB ID, and transmits "E-RAB Modification Confirmation" to the S-MeNB 200M1. In step S515, the MME 300C transmits "Path Switch Request ACK" to the T-MeNB 200M2.

In the second method, in step S516, the T-MeNB 200M2 transmits "Path Switch Request" to the MME 300C. "Path Switch Request" includes a list of E-RAB IDs to which UL-TEID is not to be modified. The MME 300C keeps UL-TEID corresponding to E-RAB ID in the list. In step S517, the MME 300C transmits "Path Switch Request ACK" to the T-MeNB 200M2.

In step S518, the T-MeNB 200M2 transmits "UE Context Release" to the S-MeNB 200M1. The S-MeNB 200M1 releases the context information of the UE 100.

This sequence assumes that the configuration in the SeNB 200S fails (in the case of NACK in S507). In this case, when the conventional handover procedure, which does not keep the SeNB 200S, is enabled, the T-MeNB 200M2 transmits the "Handover Request Acknowledge" message including the configuration information of the T-MeNB 200M2 (RRC container) to the S-MeNB 200M1. The "Handover Request Acknowledge" message includes the information (DC unsuccessful initiated) on the failure of the inter-MeNB handover procedure. Thereby, even when the configuration in the SeNB 200S fails, the conventional handover procedure can be performed. Alternatively, the S-MeNB 200M1 may perform the procedure of releasing the SeNB 200S (SeNB Release Request).

Further, the information on the failure of the inter-MeNB handover procedure may include a cause of the failure (Cause). A cause of the failure is "X2 connection unavailable," "S-GW relocation," or the like, for example. The information may be used for applications of SON (Self Organizing Network).

Alternatively, when the configuration in the SeNB 200S fails, or for example, when the "Handover Request" message is directed for load distribution, handover negative acknowledge may be transmitted to the S-MeNB 200M1.

[First Modification of Third Embodiment]

The inter-MeNB handover procedures for SCG bearer option and split bearer option will be described, respectively. Specific IEs of each message will be also described by way of example according to the present modification.

(1) SCG Bearer Option

Figure 17:
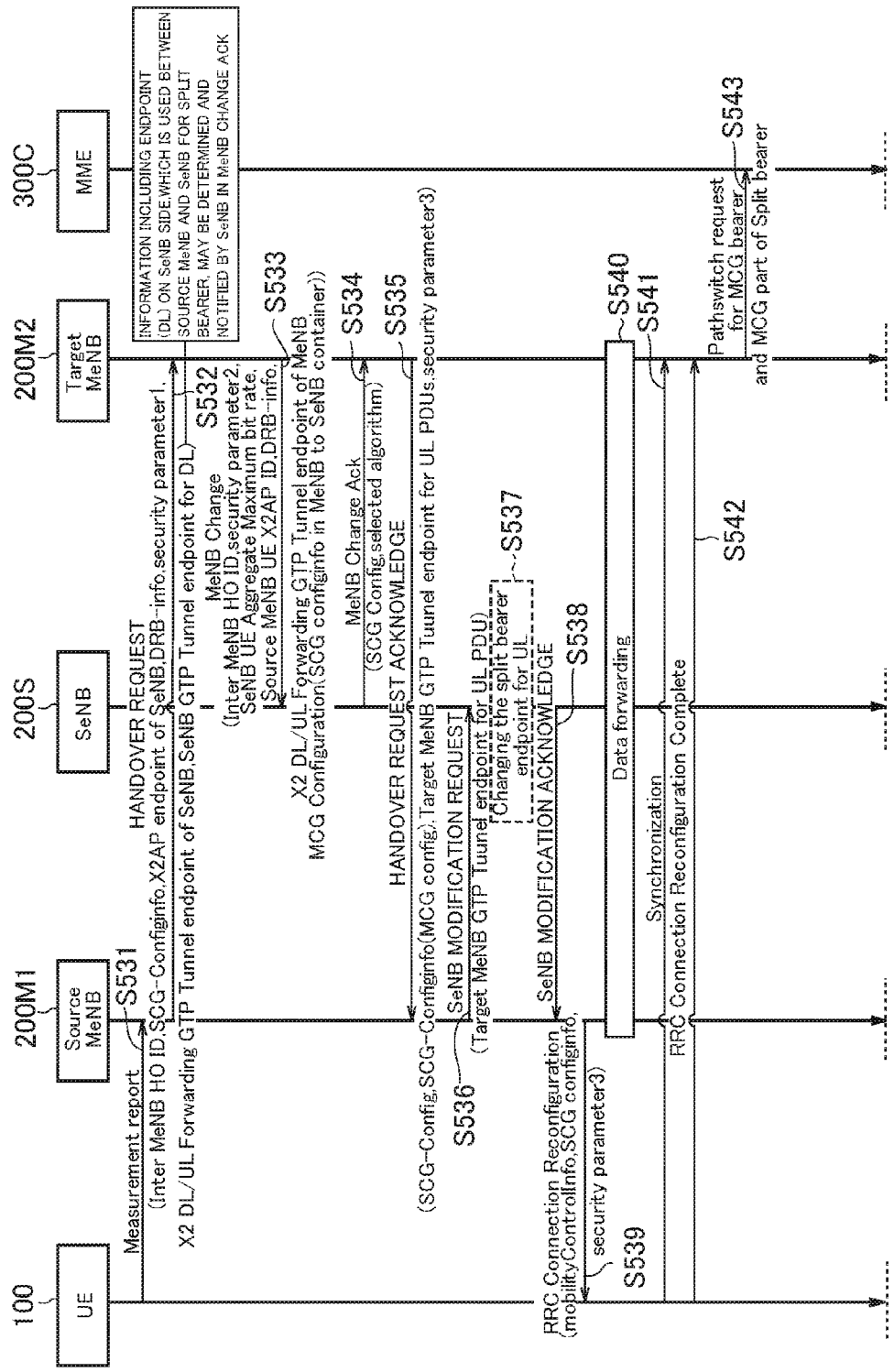
FIG. 17 is a sequence diagram illustrating an inter-MeNB handover procedure according to a first modification of the third embodiment.

FIG. 17 is a sequence diagram illustrating an inter-MeNB handover procedure according to a first modification of the third embodiment. The operations in the case of SCG bearer option will be first described.

In step S531, the UE 100 transmits "Measurement report" to the S-MeNB 200M1.

In step S532, the S-MeNB 200M1 transmits a "Handover request" message to the T-MeNB 200M2. The "Handover request" message includes the following IEs. Not all the IEs are required.

"Inter MeNB HO ID" indicating inter-MeNB handover.

"SCG-Configinfo (Source MCG config)" as MCG config of the S-MeNB 200M1

"X2AP endpoint of SeNB for X2 Interface" used for establishing X2 when the X2 interface is not present between the SeNB 200S and the T-MeNB 200M2. Alternatively, X2 may be established by Global eNB ID.

"DRB-info" including DRB ID and DRB type (Split/SCG). It is used to determine whether to be SCG or split bearer.

"security parameter 1" including security parameters such as KeNB* and Token. It includes information on KeNB*s, tokens, NCC, UE EPS security capabilities, security algorithms, and the like. The information is parameters used for calculating Reestablishment or Token on HO Failure of the UE 100. KeNB* is generated by target cell's physical cell ID and frequency EARFCN-DL of Target cell.

"X2 DL/UL Forwarding GTP TEID of SeNB" as endpoint on the SeNB 200S side of the bearer used for data forwarding required on bearer release.

In step S533, the T-MeNB 200M2 transmits "MeNB Change (change request)" to the SeNB 200S. "MeNB Change" includes the following IEs. Not all the IEs are required.

"Inter MeNB HO ID"

"Security parameter 2" as security parameter (such as S-KeNB, SCG counter, or MCG security algorithm) different from "security parameter 1" included in Handover request.

"SeNB UE Aggregate Maximum Bit Rate" as bit rate of the UE 100 to be ensured on the SeNB 200S side. This value is calculated by the T-MeNB 200M2 based on "UE Aggregate Maximum Bit Rate" included in the "Handover request" message.

"Source MeNB UE X2AP ID" indicating handover for which UE 100.

"DRB Info" indicating DRB ID and DRB type. A determination can be made as to which bearer to keep the configuration for based on the information.

"X2 DL/UL Forwarding GTP TEID of MeNB" as endpoint on the S-MeNB 200M1 side of the bearer used for data forwarding required on bearer release.

"MCG Configuration (SCG Configinfo in MeNB to SeNB container)" as MCG configuration information of the T-MeNB 200M2. This value is the same as the contents of "MeNB to SeNB container" in the "SeNB Addition" message.

In step S534, the SeNB 200S transmits "MeNB Change ACK" to the T-MeNB 200M2. "MeNB Change ACK" includes the following IEs. Not all the IEs are required.

"SCG Config" as SCG configuration information of the SeNB 200S.

"Selected algorithm" as security algorithm selected by the SeNB 200S.

In step S535, the T-MeNB 200M2 transmits a "Handover Request Acknowledge" message to the S-MeNB 200M1. The "Handover Request Acknowledge" message includes the following IEs. Not all the IEs are required.

"SCG-Config, SCG-ConfigInfo (MCG Config)" including the MCG/SCG configuration information of the T-MeNB 200M2 and the SeNB 200S.

"security parameter 3" including SCG Counter and selected algorithm SCG counter is a value used in the T-MeNB 200M2. Selected algorithm is determined by the SeNB 200S in step S534.

In the case of SCG bearer option, steps S536 to S538 are omitted.

In step S539, the S-MeNB 200M1 transmits a "RRC Connection Reconfiguration" message to the UE 100. The "RRC Connection Reconfiguration" message includes the IEs included in the "Handover Request Acknowledge" message.

In step S540, data forwarding is performed from the S-MeNB 200M1 to the T-MeNB 200M2.

In step S541, the UE 100 establishes synchronization with the T-MeNB 200M2.

In step S542, the UE 100 performs the processing of establishing RRC connection with the T-MeNB 200M2.

In step S543, the T-MeNB 200M2 transmits "Path Switch Request" to the MME 300C. "Path Switch Request" includes DL TEID for MCG bearer of the T-MeNB 200M2.

Figure 18A:
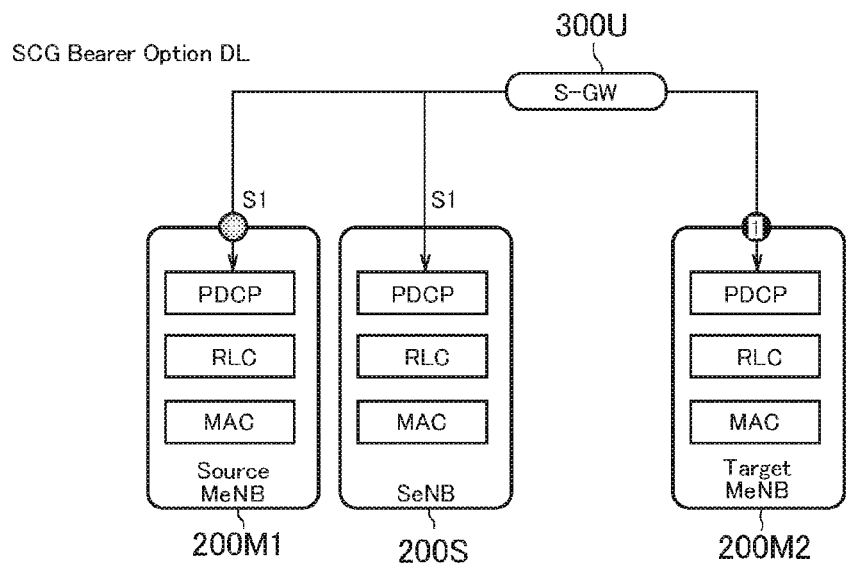
FIGS. 18A and 18B are diagrams illustrating TEID in case of SGB bearer option.
Figure 18B:
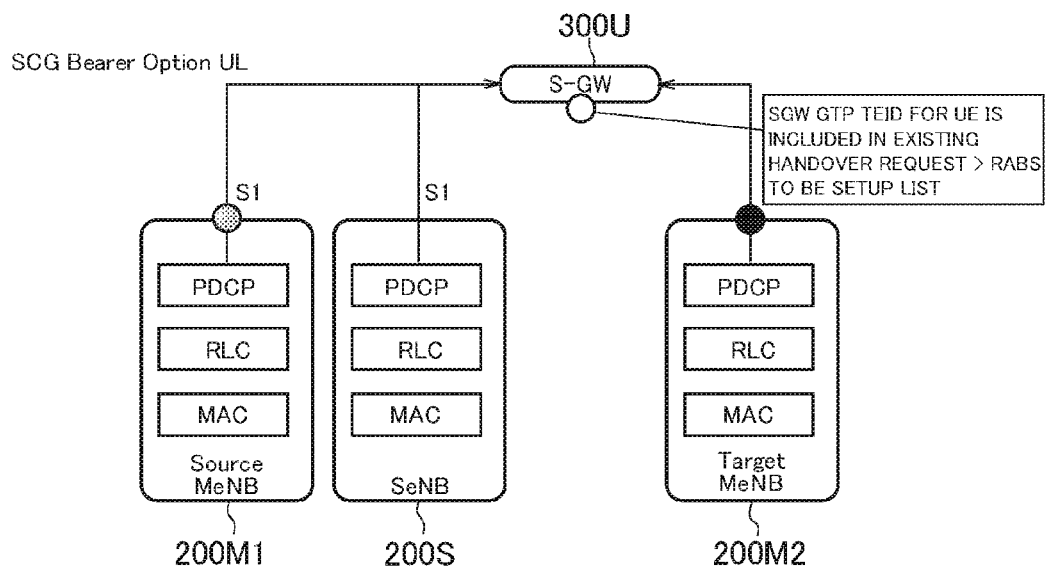

FIGS. 18A and 18B are the diagrams for explaining TEID in the case of SCG bearer option.

As illustrated in FIG. 18A, downlink MCG bearer is switched from the S-MeNB 200M1 to the T-MeNB 200M2 in the inter-MeNB handover procedure, and thus DL TEID of the T-MeNB 200M2 indicated in "1" in FIG. 18A is notified to the MME 300C. DL TEID for SCG bearer is not changed.

As illustrated in FIG. 18B, UL-TEID for MCG bearer is handed over from the S-MeNB 200M1 to the T-MeNB 200M2 in the "Handover request" message in the inter-MeNB handover procedure. As described above, UL-TEID for SCG bearer should not be changed.

(2) Split Bearer Option

Figure 19A:
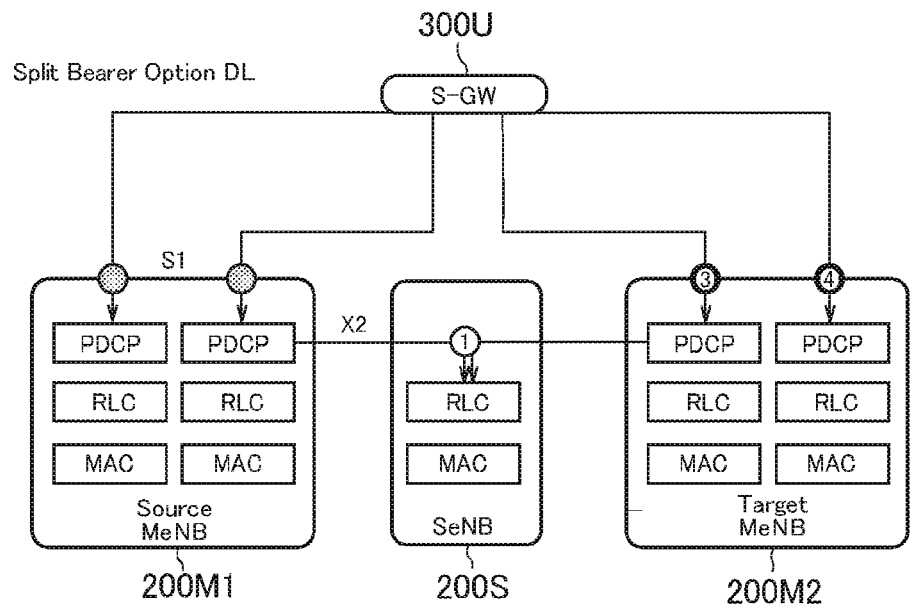
FIGS. 19A and 19B are diagrams illustrating TEID in case of split bearer option.
Figure 19B:
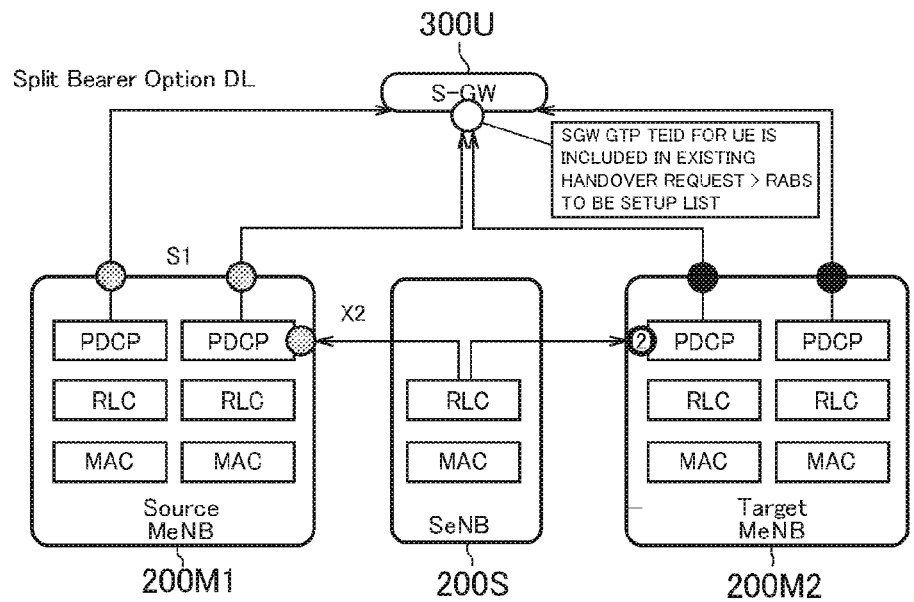

The operations in the case of split bearer option will be described with reference to FIGS. 17A and 17B, and FIGS. 19A and 19B. FIGS. 19A and 19B are the diagrams for explaining TEID in the case of split bearer option. The operations different from those in SCG bear option will be described herein.

As indicated in "1" in FIG. 19A, DL-TEID in the SeNB 200S is not changed in the inter-MeNB handover procedure. DL-TEID is notified to the T-MeNB 200M2 by the IE of "SeNB GTP TEID for DL" in step S532 ("Handover Request") or step S534 ("MeNB Change ACK") in FIG. 17.

As indicated in "2" in FIG. 19B, UL-TEID in the S-MeNB 200M1 is switched to UL-TEID in the T-MeNB 200M2 in the inter-MeNB handover procedure. UE-TEID is notified to the SeNB 200 via the S-MeNB 200M1 by the IE of "T-MeNB GTP TEID for UL" in step S535 ("Handover Request Acknowledge") or S536 ("SeNB Modification Request") in FIG. 17, and UL-TEID is changed by the SeNB 200S in step S537.

Further, as indicated in "3" and "4" in FIG. 19A, DL-TEID in the S-MeNB 200M1 is switched to DL-TEID in the T-MeNB 200M2 for MCG bearer and SCG bearer, respectively, in the inter-MeNB handover procedure. The DL-TEIDs are notified to the MME 300C by the IE of "MCG part of split bearer" in step S543 ("Path Switch Request") in FIG. 17.

[Second Modification of Third Embodiment]

According to a second modification of the third embodiment, the T-MeNB 200M2 transmits a "Handover Request Acknowledge" message to the S-MeNB 200M1 before transmitting a modification request acknowledge ("SeNB Modification Request Acknowledge") message to the SeNB 200S.

FIG. 20 is a sequence diagram illustrating an inter-MeNB handover procedure according to the second modification of the third embodiment.

As illustrated in FIG. 20, in step S561, the UE 100 transmits "Measurement report" to the S-MeNB 200M1.

In step S562, the S-MeNB 200M1 transmits a "Handover Request" message to the T-MeNB 200M2.

In step S563, the T-MeNB 200M2 transmits a "Handover Request Acknowledge" message to the S-MeNB 200M1 in response to receipt of the "Handover Request" message.

In step S564, the T-MeNB 200M2 transmits a "SeNB Modification Request" message to the SeNB 200S.

In step S565, the SeNB 200S transmits a "SeNB Modification Request ACK" message to the T-MeNB 200M2 in response to receipt of the "SeNB Modification Request" message.

In step S566 at the same time with step S565, the SeNB 200S transmits a message (message X) including the SCG configuration information to the S-MeNB 200M1. The message X may be an extended existing message or a newly-defined message.

In step S567, the T-MeNB 200M2 merges the MCG configuration information acquired in step S562 (the configuration information in the S-MeNB 200M1) and the SCG configuration information acquired in step S565.

In step S568, the S-MeNB 200M1 merges the MCG configuration information acquired in step S563 (the configuration information in the T-MeNB 200M2) and the SCG configuration information acquired in step S566. When the timer is activated in response to receipt of the "Handover Request Acknowledge" message in step S563 and the message X (S566) cannot be acquired before the timer expires, the S-MeNB 200M1 may determine that the inter-MeNB handover procedure fails. In this case, the handover procedure may be switched to the normal handover procedure or may be stopped. The value of the timer may be set by OAM or may be acquired by inter-eNB negotiation.

In step S569, the S-MeNB 200M1 transmits a "RRC Connection Reconfiguration" message including the MCG configuration information and the SCG configuration information to the UE 100.

In step S570, the UE 100 establishes synchronization with the T-MeNB 200M2.

In step S571, the UE 100 performs the processing of establishing RRC connection with the T-MeNB 200M2.

In step S572, the T-MeNB 200M2 transmits "Path Switch Request" to the MME 300C.

[Fourth Embodiment]

The fourth embodiment will be described below mainly in the differences from the first embodiment to the third embodiment.

According to the fourth embodiment, a modification request (SeNB Modification Request) message for requesting to modify the configuration in the SeNB 200S is transmitted from the S-MeNB 200M1 to the SeNB 200S. The "SeNB Modification Request" message includes the information (inter-MeNB HO indicator) on the inter-MeNB handover procedure.

FIG. 21 is a sequence diagram illustrating an inter-MeNB handover procedure according to the fourth embodiment.

As illustrated in FIG. 21, in step S601, the S-MeNB 200M1 transmits a "Handover Request" message to the T-MeNB 200M2.

In step S602, the S-MeNB 200M1 transmits a "SeNB Modification Request" message to the SeNB 200S. The "SeNB Modification Request" message includes the information indicating the inter-MeNB handover procedure (MeNB Change Indicator) and the identification information of the T-MeNB 200M2 (T-MeNB ID).

In step S603, the SeNB 200S transmits a modification request (SeNB Modification Required) message for requesting to modify the configuration of the SeNB 200S to the T-MeNB 200M2 in response to receipt of the "SeNB Modification Request" message. The "SeNB Modification Required" message includes the ID on the X2 interface of the S-MeNB 200M1 (S-MeNB X2AP ID) and the SCG configuration information (SCG configuration).

The T-MeNB 200M2 collates and associates X2AP ID in the "Handover Request" message received from the S-MeNB 200M1 with "S-MeNB X2AP ID" in the "SeNB Modification Required" message received from the SeNB 200S.

When collated, in steps S604 and S605, the processing of modifying the configuration of the SeNB 200S is performed between the T-MeNB 200M2 and the SeNB 200S. The processings in steps S604 and S605 are not essential.

In step S606, the T-MeNB 200M2 transmits a "Handover Request Acknowledge" message to the S-MeNB 200M1. The "Handover Request Acknowledge" message includes the SCG and MCG configuration information. When the timer is activated on transmission of the "SeNB Modification Request" message in step S602 and the "Handover Request Acknowledge" message cannot be acquired before the timer expires, the S-MeNB 200M1 determines that the inter-MeNB handover procedure fails, and may cope with the fact as described above.

In step S607, the S-MeNB 200M1 transmits a "RRC Connection Reconfiguration" message to the UE 100 in response to receipt of the "Handover Request Acknowledge" message.

In step S608, the UE 100 performs the processing of establishing RRC connection with the T-MeNB 200M2.

In step S609, a confirmation (SeNB Modification Confirm) message for the "SeNB Modification Required" message in step S603 is transmitted to the SeNB 200S.

In step S610, the SeNB 200S transmits an acknowledge (SeNB Modification Request ACK) message for the "SeNB Modification Request" message in step S602 to the S-MeNB 200M1 in response to receipt of the "SeNB Modification Confirm" message. The "SeNB Modification Request ACK" message includes "MeNB Change Indicator."

In step S611, the S-MeNB 200M1 releases the SeNB 200S in response to receipt of the "SeNB Modification Request ACK" message.

In step S612, "Path Switcht" (and "Path Update") as described above is performed.

In step S613, the T-MeNB 200M2 transmits "UE Context Release" to the S-MeNB 200M1.

This sequence may be partially modified as follows. Specifically, the SeNB 200S transmits "SeNB Modification Request ACK" including "SCG Configuration" to the S-MeNB 200M1 instead of transmitting "SeNB Modification Request ACK" to the T-MeNB 200M2 in step S605. In this case, "Handover Request ACK" in step S606 may not include "SCG Configuration."

[Fifth Embodiment]

The fifth embodiment will be described below mainly in the differences from the first embodiment to the fourth embodiment.

According to the fifth embodiment, the SeNB 200S transmits a "Handover Request" message for requesting to hand over the UE 100 to the T-MeNB 200M2 in response to receipt of the "SeNB Modification Request" message from the S-MeNB 200M1. That is, the SeNB 200S, instead of the S-MeNB 200M1, transmits the "Handover Request" message to the T-MeNB 200M2.

Figure 22:
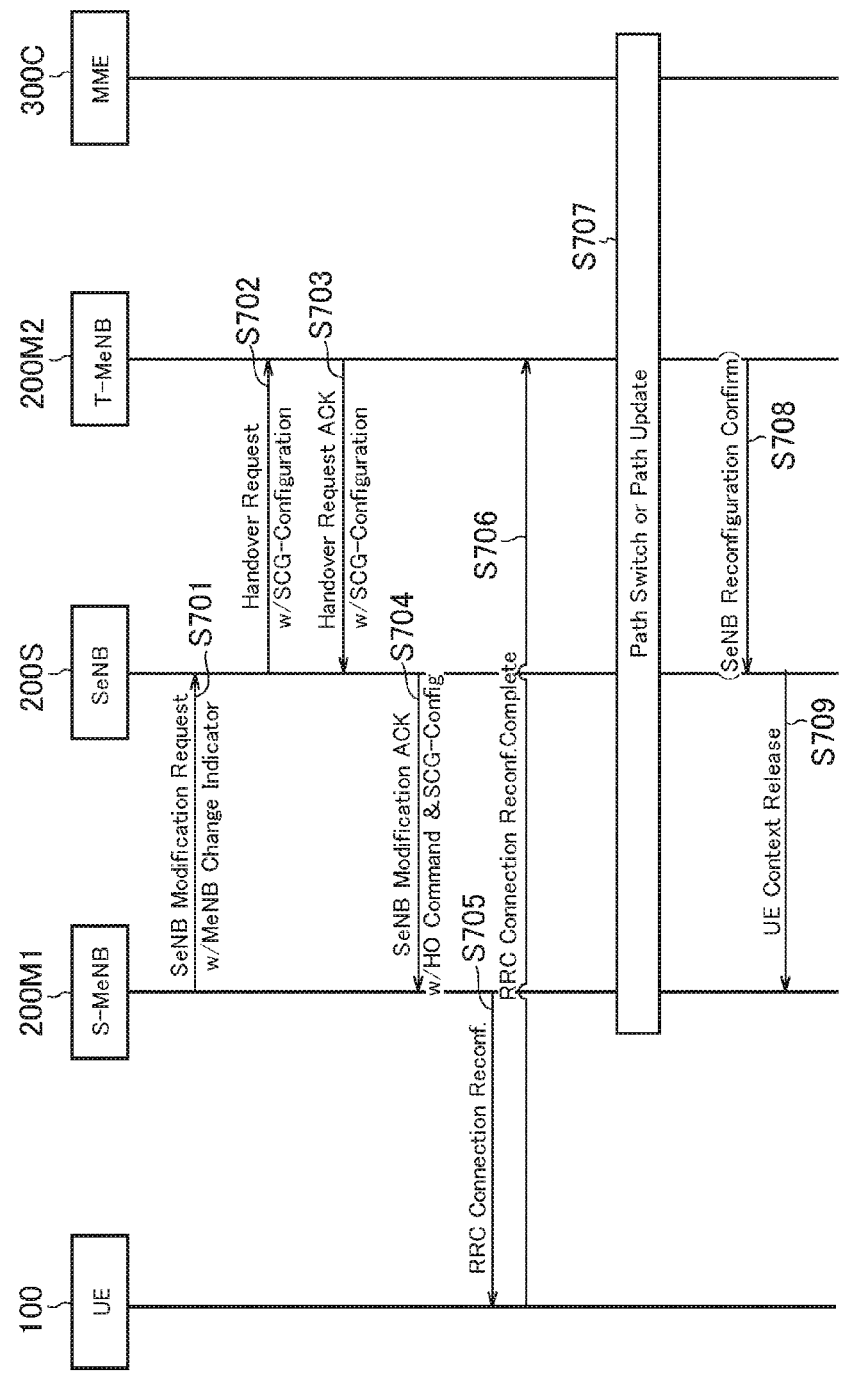
FIG. 22 is a sequence diagram illustrating an inter-MeNB handover procedure according to a fifth embodiment.

FIG. 22 is a sequence diagram illustrating an inter-MeNB handover procedure according to the fifth embodiment.

As illustrated in FIG. 22, in step S701, the S-MeNB 200M1 transmits a "SeNB Modification Request" message to the SeNB 200S. The "SeNB Modification Request" message includes the information indicating the inter-MeNB handover procedure (MeNB Change Indicator) and the identification information of the T-MeNB 200M2 (T-MeNB ID).

In step S702, the SeNB 200S transmits a "Handover Request" message to the T-MeNB 200M2 in response to receipt of the "SeNB Modification Request" message. The "Handover Request" message includes the SCG configuration information (SCG configuration).

In step S703, the T-MeNB 200M2 transmits a "Handover Request Acknowledge" message to the SeNB 200S in response to receipt of the "Handover Request" message. The "Handover Request Acknowledge" message includes the SCG and MCG configuration information.

In step S704, the SeNB 200S transmits an acknowledge (SeNB Modification ACK) message for the "SeNB Modification Request" message in step S701 to the S-MeNB 200M1 in response to receipt of the "Handover Request Acknowledge" message. The "SeNB Modification ACK" message includes the SCG and MCG configuration information.

In step S705, the S-MeNB 200M1 transmits a "RRC Connection Reconfiguration" message to the UE 100 in response to receipt of the "SeNB Modification ACK" message.

In step S706, the UE 100 performs the processing of establishing RRC connection with the T-MeNB 200M2.

In step S707, "Path Switch" (and "Path Update") as described above is performed.

In step S708, the T-MeNB 200M2 transmits a "SeNB Reconfiguration Confirm" message to the SeNB 200S. The processing in step S708 is not essential.

In step S709, the SeNB 200S transmits "UE Context Release" to the S-MeNB 200M1.

[Sixth Embodiment]

The sixth embodiment will be described below mainly in the differences from the first embodiment to the fifth embodiment.

According to the sixth embodiment, not "SeNB Modification" but "SeNB Addition" is used in the progress of the inter-MeNB handover procedure. Specifically, the T-MeNB 200M2 transmits an addition request (SeNB Addition Request) message for configuration the SeNB 200S as new SeNB for the UE 100 to the SeNB 200S in response to receipt of the "Handover Request" message from the S-MeNB 200M1. Thereby, the dual configuration for the UE 100 may be temporarily present in the SeNB 200S in the progress of the inter-MeNB handover procedure.

Figure 23:
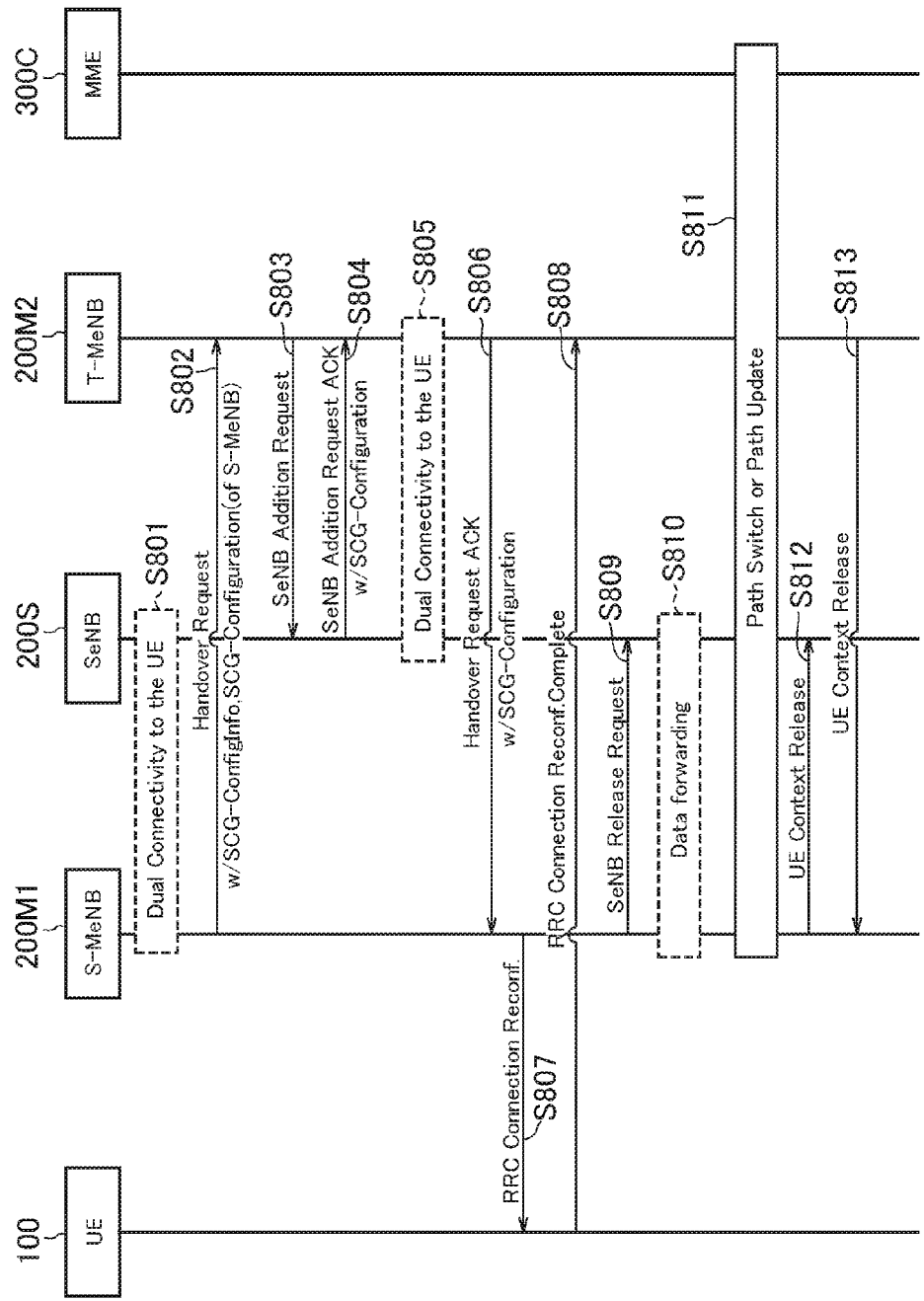
FIG. 23 is a sequence diagram illustrating an inter-MeNB handover procedure according to a sixth embodiment.

FIG. 23 is a sequence diagram illustrating an inter-MeNB handover procedure according to the sixth embodiment.

As illustrated in FIG. 23, in step S801, the S-MeNB 200M1 and the SeNB 200S make dual connectivity communication with the UE 100.

In step S802, the S-MeNB 200M1 transmits a "Handover Request" message to the T-MeNB 200M2.

In step S803, the T-MeNB 200M2 transmits a "SeNB Addition Request" message to the SeNB 200S in response to receipt of the "Handover Request" message.

In step S804, the SeNB 200S transmits an acknowledge (SeNB Addition Request ACK) message to the T-MeNB 200M2 in response to receipt of the "SeNB Addition Request" message.

Consequently, in step S805, the SeNB 200S and the T-MeNB 200M2 enter the dual connectivity enabled state. On the other hand, the original configuration information (the configuration information for the S-MeNB 200M1) is kept in the SeNB 200S.

In step S806, the T-MeNB 200M2 transmits a "Handover Request Acknowledge" message to the S-MeNB 200M1. The "Handover Request Acknowledge" message includes the SCG and MCG configuration information.

In step S807, the S-MeNB 200M1 transmits a "RRC Connection Reconfiguration" message to the UE 100 in response to receipt of the "Handover Request Acknowledge" message.

In step S808, the UE 100 performs the processing of establishing RRC connection with the T-MeNB 200M2.

In step S809, the S-MeNB 200M1 transmits a "SeNB Release Request" message to the SeNB 200S. Consequently, the original configuration information (the configuration information for the S-MeNB 200M1) in the SeNB 200S is released.

In step S810, the data forwarding processing is performed between the S-MeNB 200M1 and the SeNB 200S. The processing in step S810 is not essential.

In step S811, "Path Switcht" (and "Path Update") as described above is performed.

In step S812, the S-MeNB 200M1 transmits "UE Context Release" to the SeNB 200S.

In step S813, the T-MeNB 200M2 transmits "UE Context Release" to the S-MeNB 200M1.

[Other Embodiment]

Two or more embodiments may be combined not limited to each embodiment independently performed.

In the above embodiments, a case in which the communication in the dual connectivity scheme in a combination of the macro cell and the small cell has been described. However, the above combination is not restrictive: a communication in a dual connection scheme in a combination of a macro cell and a picocell and a communication in a dual connection scheme in a combination of a picocell and a femtocell may also be performed.

In the above embodiments, the LTE system is described as an exemplary mobile communication system, but the present disclosure is not limited thereto. The present disclosure may be applied also to other systems than the LTE system.

[Additional Statement]

1. Introduction

This additional statement explains the mechanisms needed for MCG handover and SCG handover, taking into account various handover scenarios.

2. Terminologies

As indicated above, the functionality of "MCG handover" and "SCG handover" is one of the main agenda items for dual connectivity. Before the terms "MCG handover" and "SCG handover" are adopted, we should first consider the implications of using these terminologies. Since MCG implies the possibility that both PCell and SCells are configured to the UE by intra-eNB Carrier Aggregation (intra-eNB CA), the use of the term "MCG handover" may be misleading and may contradict with the existing intra-eNB CA handover procedure, since the existing intra-eNB CA procedure only allows PCell handover. However, the existing intra-eNB CA procedure may imply a capability on combining PCell handover with DC functionality. Although such functionality is not yet assumed in pre-Rel-12, to facilitate further discussion on this functionality, it is suggested that the term "PCell handover with DC" be used to refer to such functionality. Further details on the usefulness of this functionality are discussed later.

Observation 1: MCG handover consisting of both PCell and SCells is not permitted according to the existing intra-eNB CA handover procedure.

Proposal 1: PCell handover with DC should be used to refer to the handover between two MeNBs while dual connectivity is activated. It is FFS whether such functionality is really needed.

Similarly, it is suggested that "Special Cell handover" be used to describe the handover between two SeNBs instead of "SCG handover". This would provide consistent procedure with the handovers between two MeNBs.

Proposal 2: Special Cell handover should be used to refer to the handover between two SeNBs during dual connectivity. It is FFS whether such functionality is really needed.

3. Handover Scenarios

Figure 24:
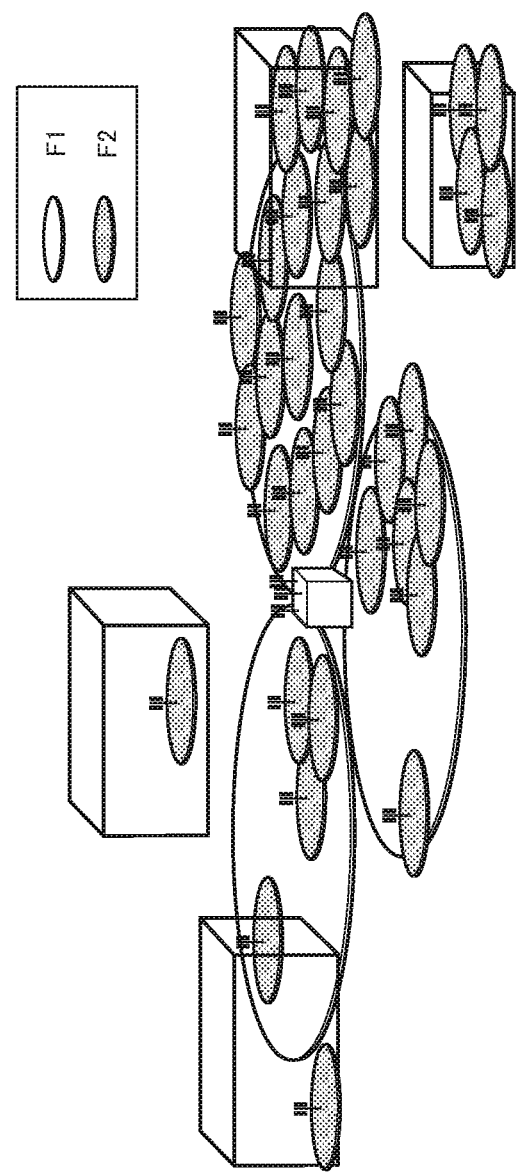
FIG. 24 is a diagram according to an additional statement 1 of embodiments.

The targeted deployment scenario is illustrated in FIG. 24. The dense small cell deployment shown in FIG. 24 was required to support huge traffic in some scenarios e.g. dense urban or large shopping mall In particular, with dense small cell deployments, it's reasonable to expect many small cells deployed at boundaries of macro cells (refer to the upper right macro cell in FIG. 24, as an example).

Observation 2: Many small cells may be deployed near macro cells boundaries.

As a result of observation 2, handover procedures with dual connectivity should not be excluded for consideration. Specifically, PCell handover with DC may be useful under the following scenario:

Scenario M1: A SeNB is deployed on the cell edge between a source MeNB (S-MeNB) and a target MeNB (T-MeNB).

And Special Cell handover may be useful under the following scenario:

Scenario S2: A source SeNB (S-SeNB) and a target SeNB (T-SeNB) are deployed within coverage of a MeNB.

Figure 25:
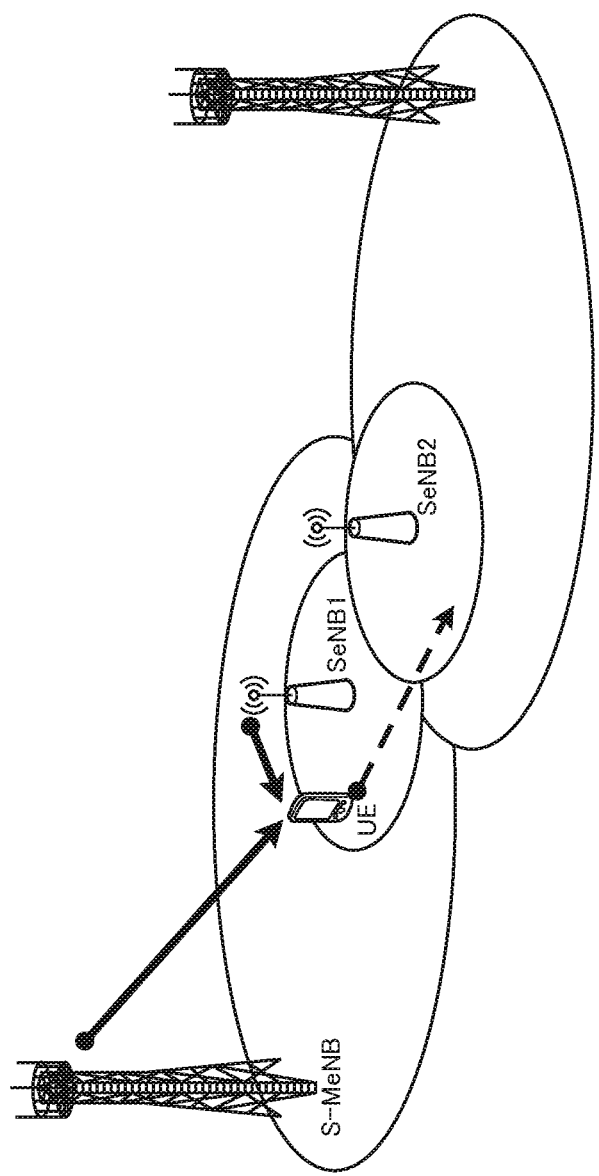
FIG. 25 is a diagram according to the additional statement 1 of embodiments.

Finally, a combination of PCell handover with DC and Special Cell handover may be useful under the following scenario:

Scenario M3: A SeNB (SeNB1) is deployed within coverage of S-MeNB and a neighbor SeNB (SeNB2) is deployed within coverage of T-MeNB. Note that the cell edges between MeNBs and the cell edges between SeNBs are in the same region. (FIG. 25)

Proposal 3: we should take into account the three handover scenarios involving dual connectivity.

4. Possible handover procedures 4.1. PCell handover with DC 4.1.1. Scenario M1

4.1.1.1. Issues with current handover procedure

Figure 26:
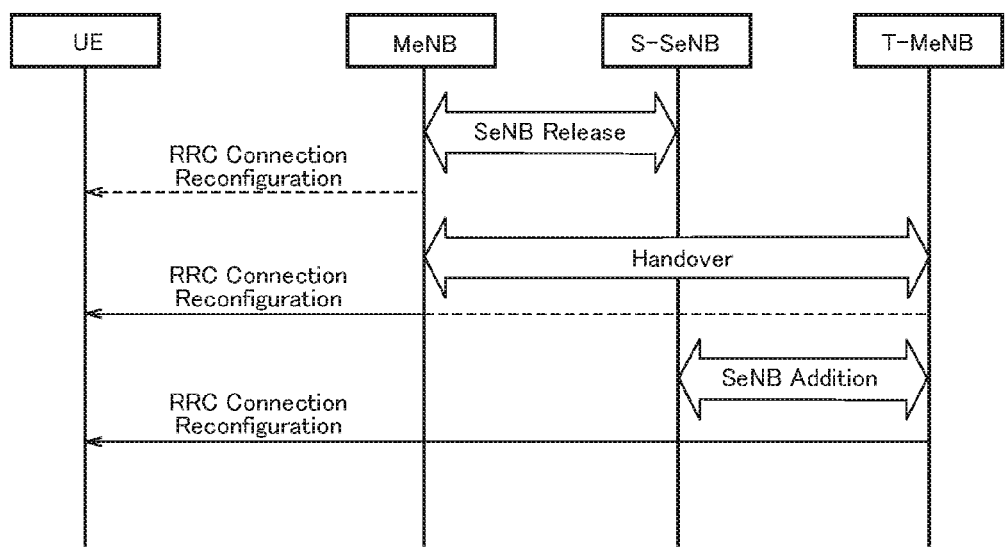
FIG. 26 is a diagram according to the additional statement 1 of embodiments.

A straightforward application of the current handover procedure with dual connectivity for Scenario M1 is illustrated in FIG. 26. This handover procedure assumes three RRC Connection Reconfiguration messages are needed to complete the handover for dual connectivity; one for the release of SeNB, one for the MeNB handover and one for the addition of the same SeNB. The increased number of RRC Connection Reconfiguration messages for this handover procedure may result in more occasions of RLF/HOF as well as throughput degradations.

Observation 3: With Scenario M1, the current procedure for releasing and adding the same SeNB during a PCell handover requires multiple RRC Connection Reconfigurations that may lead to increased RLF/HOF.

4.1.1.2. Details of PCell Handover with DC

Figure 27:
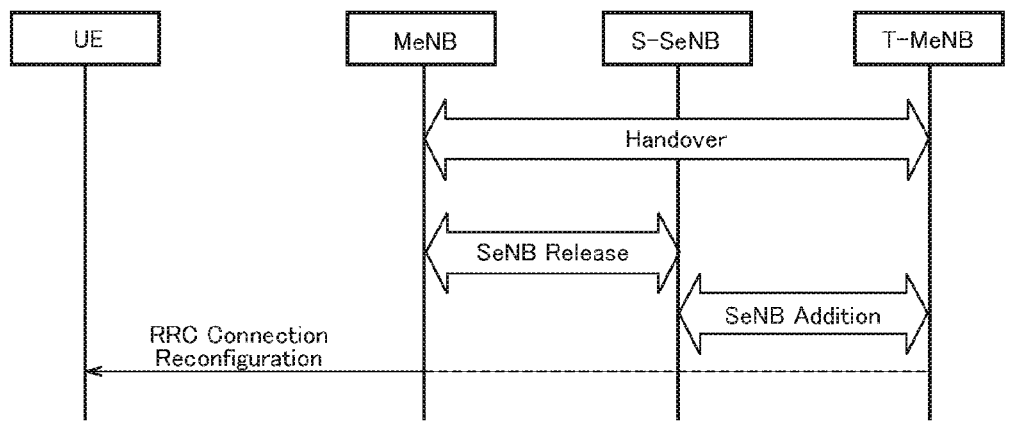
FIG. 27 is a diagram according to the additional statement 1 of embodiments.

To reduce the number of unnecessary RRC Connection Reconfigurations, an enhanced handover procedure may be considered as described in FIG. 27. The procedure allows the UE to keep at least the Special Cell during the PCell handover with DC so that only one RRC Connection Reconfiguration is needed. The PCell handover with DC may be realized using one of the following alternatives:

ALT 1: The handover request message may include parameters associated with the existing SeNB configurations, so that the T-MeNB may initiate SeNB addition procedure towards the SeNB.

ALT 2: The handover request message may include a simple indication that the handover procedure involves dual connectivity. The T-MeNB (or possibly the SeNB) initiates SeNB addition procedure before handover completion.

With either alternative, it is assumed that after the admission control in T-MeNB, the SeNB is released from S-MeNB and added to T-MeNB in advance of reconfiguration of the UE. Subsequently, the T-MeNB will send an RRC container with both configurations for handover and SeNB addition to the S-MeNB where the final RRC Connection Reconfiguration will be sent to the UE.

Observation 4: Enhanced PCell handover with DC procedure can reduce the number of RRC Connection Reconfiguration messages and allow the UE to keep the SCG configuration.

Proposal 4: we should decide if either of the two alternatives should be used to realize PCell handover with DC.

Proposal 5: we should consider the option to enhance the MeNB handover procedure involving dual connectivity with just one RRC Connection Reconfiguration.

4.2. Special Cell handover
4.2.1. Scenario S2

Figure 28:
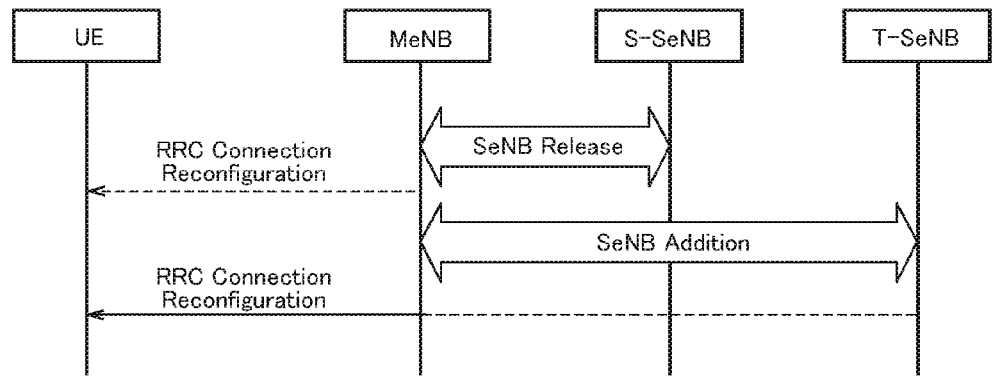
FIG. 28 is a diagram according to the additional statement 1 of embodiments.

The concept of Special Cell handover is new; however, this may be easily realized using the current handover procedure and SeNB addition/modification/release procedures as shown in FIG. 28.

In contrast to PCell handover with DC, Special Cell handover can be realized by using the SeNB Addition/Modification and SeNB Release functionalities in the SeNB Addition/Modification Request message since the RRC entity with the MeNB remains unchanged for the UE. Base on the procedure in FIG. 28, two RRC Connection Reconfiguration messages are needed. However, this can be easily reduced if the SeNB Release Response message does not contain an RRC container which means the MeNB will not need to send an RRC Reconfiguration Message to the UE just to release the S-SeNB. And this is in-line with the following agreements.

5) The MeNB does not change the content of the RRC configuration provided by the SeNB. FFS whether the MeNB requests the SeNB to release a serving cell for one of its UEs and the SeNB creates a container that will result in the release of a serving cell. Or whether the MeNB can by itself release a serving cell maintained by the SeNB. FFS whether the MeNB needs to comprehend or may reject the RRC Container received from the SeNB. FFS how MeNB and SeNB "share" e.g. the L1 processing capabilities.

Observation 5: The number of RRC Connection Reconfiguration messages used in the Special Cell handover can be reduced if an RRC container is not included within the SeNB Release Response message.

Figure 29:
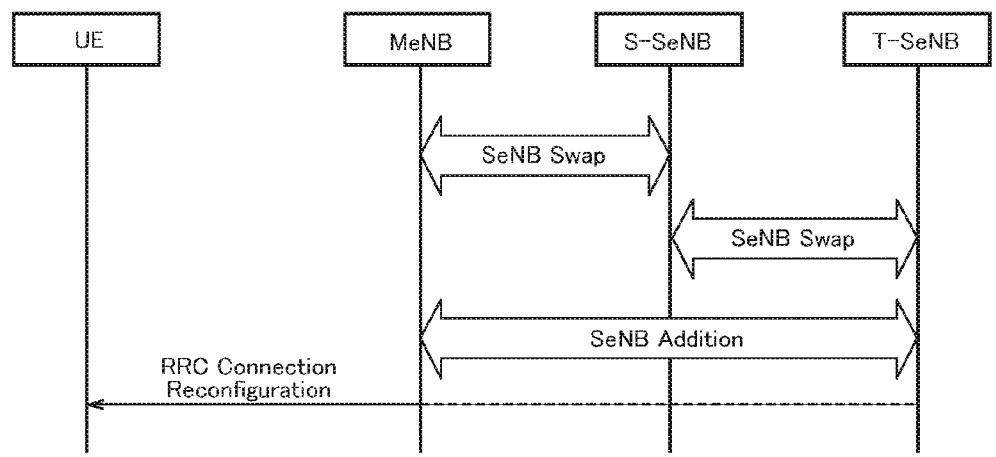
FIG. 29 is a diagram according to the additional statement 1 of embodiments.

Another alternative is to define a new message such as the "SeNB Swap Request" without an RRC container. Referring to FIG. 29, either the MeNB or the S-eNB may initiate the SeNB Swap procedure which is used to inform the other eNB of the Special Cell handover. After coordination between eNBs is completed, the T-SeNB sends the Addition/Modification Command containing RRC container to the MeNB, whereby the MeNB may subsequently forward the RRC container within the RRC Connection Reconfiguration to the UE.

Proposal 6: we should decide if the SeNB Release Response should include the RRC container for the Special Cell handover.

4.3. Scenario M3

In this scenario, the cell edges of both MeNBs and SeNBs are in the same region. There are three alternatives to be considered;

ALT1: PCell handover is initiated after SeNB1 release. This is the same as current intra-eNB PCell handover procedure. SeNB2 may be added after HO completion.

ALT2: PCell handover with DC is initiated while the SeNB1 configuration is kept. Then a Special cell handover is separately initiated from SeNB1 to SeNB2. This alternative basically assumes the handover procedure for M1 and S2 are separately initiated.

ALT3: Both PCell handover with DC and Special cell handover are initiated simultaneously. It needs a parallel handover procedure combining scenarios M1 and S2.

With ALT2 and ALT3, a separate handover enhancement procedure is not needed. Instead, it is sufficient to reuse the handover procedures discussed for scenario M1 and scenario S2.

Observation 6: Enhanced handover procedure for Scenario M1 and S2 may be applicable to Scenario M3. A separate enhanced procedure for Scenario M3 is not needed.

5. Other Constraints for Handover Scenario

The Xn functionality for dual connectivity is realized over the existing X2 interface. Therefore, enhanced dual connectivity procedure is not applicable over the S1 interface. For handovers with dual connectivity, the SeNB should be released from the UE before S1 handover procedure is completed.

Observation 7: Enhanced handover procedures for dual connectivity should only be applicable over the X2 interface.

[Additional Statement 2]

1. Introduction

The procedure for the "MeNB to MeNB handover" was decided not to be supported in Rel-12, i.e., the SeNB should be released upon inter-eNB handover. On the other hand, Rel-12 Dual Connectivity has already specified the two procedures for the "MeNB to eNB change" performed in case of inter-eNB handover and the "Intra-MeNB change involving SCG change" performed in case of retaining the MeNB's role, which could be considered as a baseline of Rel-13 study.

In this additional statement, we discuss on for alternatives of high-level procedure design to support the "inter-MeNB handover without SeNB change", based on the Rel-12 procedures.

2.1. Working Assumption

First of all, it should be clarified what "without SeNB change" stated in the SID is. We assume it implies different requirements from different perspectives;

(UE Configuration Perspective)

According to the "intra-MeNB change involving SCG change" in Rel-12, the UE could be reconfigured by one RRC Connection Reconfiguration message without SCG configuration release, which means the handover without SeNB change has already supported only in intra-eNB case from the UE point of view. For the inter MeNB handover case in Rel-13, the statement "without SeNB change" can be interpreted as a single RRC Connection Reconfiguration including SeNB setup without SCG configuration release during the inter-eNB handover procedure.

Observation 1: A single RRC Connection Reconfiguration may be involved during the inter-MeNB handover procedure.

Figure 30:
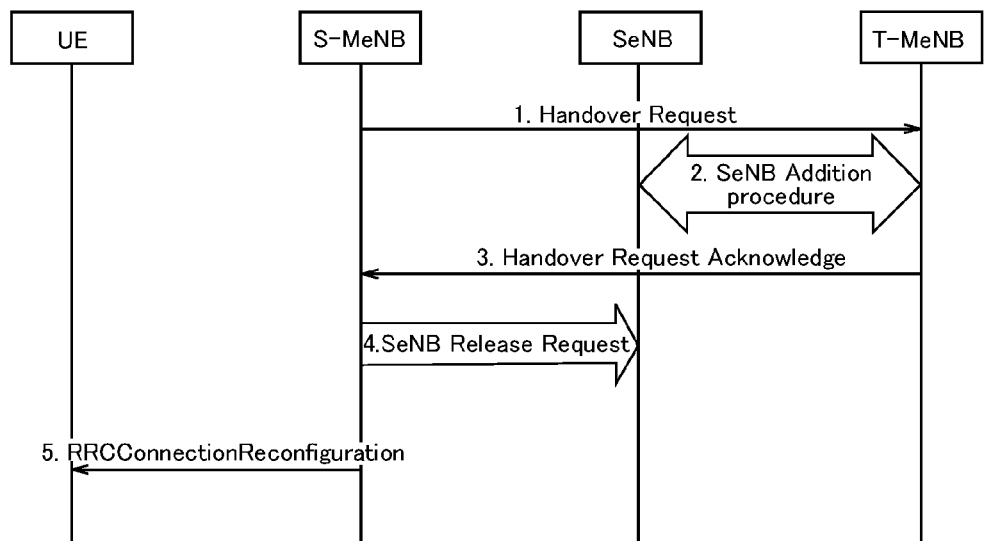
FIG. 30 is a diagram according to an additional statement 2 of embodiments.

In the "MeNB to eNB change" procedure in Rel-12, SeNB resources are released before the UE is handed over to the target eNB. After the "MeNB to eNB change" procedure is complete, the target eNB may establish dual connectivity using the SeNB Addition Preparation procedure. So, it is considered that a possible procedure for the inter-MeNB handover without SeNB change in Rel-13 may involve the SeNB Addition Preparation procedure during the Handover Preparation (see FIG. 30).

Figure 31:
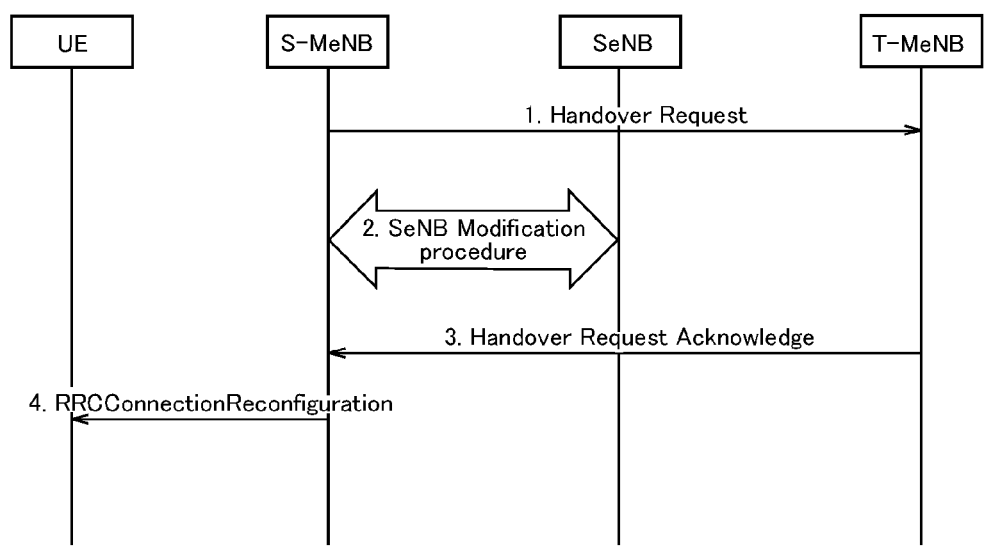
FIG. 31 is a diagram according to an additional statement 2 of embodiments.

Instead, if we refer to "intra-MeNB change involving SCG change" as a baseline for Rel-13, the SeNB Modification Preparation procedure may be involved during the Handover Preparation (see FIG. 31). However, since the Rel-12 procedure assumed to be performed within an eNB, it's not clear which MeNB initiates the SeNB Modification Preparation procedure, i.e. the source-MeNB or the target-MeNB. Additionally since the Rel-12 procedure does not consider the interaction with the Handover Preparation procedure, it's also FFS when the SeNB Modification Preparation procedure should be initiated.

Observation 2: Either the SeNB Addition Preparation or the SeNB Modification Preparation may be used for the SeNB configuration during the inter-MeNB handover.

Observation 3: If the SeNB Modification Preparation is involved during the inter-MeNB handover, it's not clear which/when MeNB should initiate the procedure.

2.2. High-level design alternatives (Alt 1: Extension of MeNB to eNB Change)

The target MeNB has a responsibility to make the final RRC configuration for the RRCConnectionReconfiguration message. In the current MeNB to eNB change procedure, the target MeNB set the SCG Configuration to release in the Target eNB To Source eNB Transparent Container. This is included in the HANDOVER REQUEST ACKNOWLEDGE message (step 3 in FIG. 30).

For not changing the SeNB during inter-MeNB handover procedure in Rel-13, the target MeNB may make the SCG Configuration to setup and fill the appropriate configurations as the HANDOVER REQUEST ACKNOWLEDGE message. For this reason, it may be a simple extension that the SeNB Addition procedure (step 2) is initiated before sending HANDOVER REQUEST ACKNOWLEDGE to the source MeNB.

The source MeNB should not initiate SeNB Release procedure (step 4) until the target MeNB sends HANDOVER REQUEST ACKNOWLEDGE since there is a possibility that the target MeNB rejects the handover request. After receiving the acknowledge, the source MeNB initiates the SeNB Release procedure towards the SeNB.

(Alt 2: Extension of Intra MeNB Change Involving SCG Change)

The intra-MeNB change involving SCG change may also be a candidate procedure to be enhanced for the inter-MeNB handover without SeNB change. In the current intra-MeNB change procedure, the MeNB initiates the SeNB Modification Preparation procedure towards the SeNB.

Considering the inter-MeNB handover case, it is not crystal clear which MeNB (i.e. either the source MeNB or the target MeNB) initiates the SeNB Modification Preparation procedure. Additionally, when the MeNB initiates the SeNB Modification Preparation procedure is also FFS, since the current SeNB Modification Preparation procedure did not assume interaction with the Handover Preparation procedure. Based on the FFSs, the 3 alternatives can be considered, as shown in (Alt 2-1. Alt 2-2 and Alt 2-3) below.

In addition, it's a common issue for each alternative how the source MeNB has the final RRC configuration before step 4 in each alternative in order to facilitate the inter-MeNB handover with a single RRCConnectionReconfiguration message. Therefore, for example, it will have to be discussed how to exchange the necessary information (e.g. SCG-configInfo, SCG-config) and negotiate for the configuration once.

(Alt 2-1: Source MeNB-Initiated SeNB Modification in Parallel with Handover Preparation)

In this alternative, the source MeNB initiates the SeNB Modification Preparation procedure during the Handover Preparation procedure. It may be initiated in parallel with the handover request (step 1 and 2 in FIG. 31).

To send the final RRC message towards the UE in step 4, the source MeNB may need to obtain the necessary information in step 2 or 3.

(Alt2-2: Source MeNB-initiated SeNB Modification following Handover Preparation)

Figure 32:
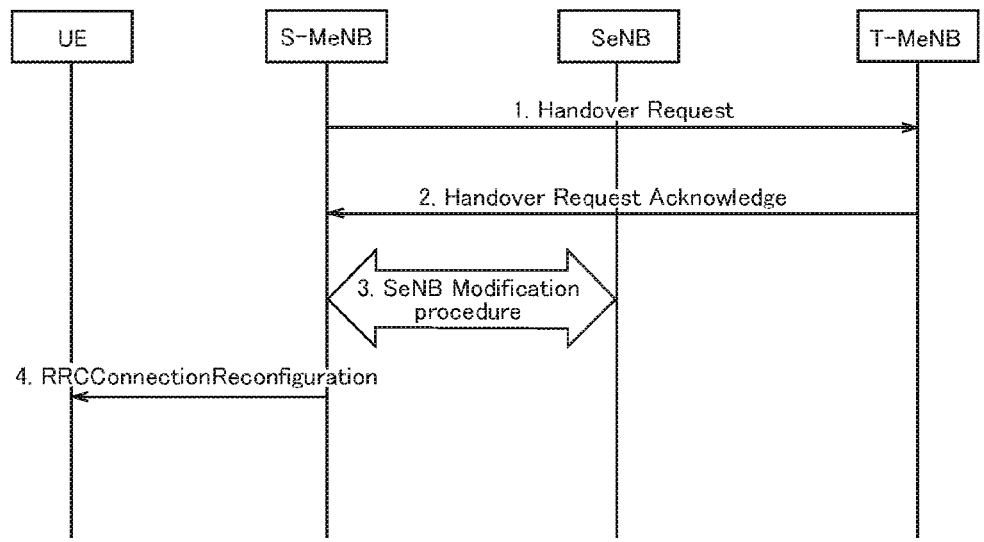
FIG. 32 is a diagram according to the additional statement 2 of embodiments.

In this alternative, the source MeNB initiates the SeNB Modification Preparation procedure after receiving the HANDOVER REQUEST ACKNOWLEDGE, which allows the source MeNB to initiate the SeNB Modification Preparation procedure (step 3 in FIG. 32).

(Alt2-3: Target MeNB-Initiated SeNB Modification)

In this alternative, the target MeNB initiates the SeNB Modification Preparation procedure (step 2 in FIG. 33) after the MeNB receives the HANDOVER REQUEST indicating the inter-MeNB handover (step 1). After completion of the SeNB Modification Preparation procedure, the target MeNB sends the response of the handover request to the source MeNB, which includes the RRC configuration for the UE (step 3).

Figure 33:
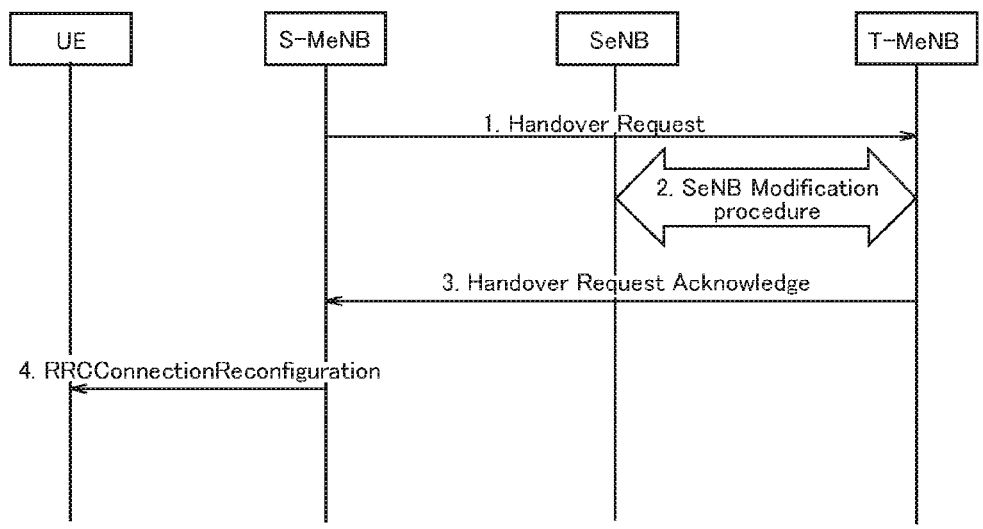
FIG. 33 is a diagram according to the additional statement 2 of embodiments.

Note that, in case where the target MeNB initiates the SeNB Modification Preparation procedure, it could be initiated before sending HANDOVER REQUEST ACKNOWLEDGE message as well as the same reason of Alt 1 (step 2 in FIG. 33).

2.3. Initial Evaluation

The initial evaluation for each alternative is provided in Table 3.

TABLE 3

| | | | Alt 2 | | |
| --- | --- | --- | --- | --- | --- |
| | | Alt 1 | Alt 2-1 | Alt 2-2 | Alt 2-3 |
| Specification impacts | Handover Preparation | May need extension, e.g., to inform of inter-MeNB HO. | May need extension, e.g., to inform of inter-MeNB HO. | May need extension, e.g., to inform of inter-MeNB HO. | May need extension, e.g., to inform of inter-MeNB HO. |
| | SeNB Addition/ Modification Preparation | — | May need extension for MeNB change. | May need extension for MeNB change. | May need additional functionality for MeNB change. |
| | Interaction between procedures | Need. | May need. | Need. | Need. |
| UE impacts | RRC Reconfiguration | Single | Single | Single | Single |
| Performance potentials | Make-before-break | May be done. | — | — | — |
| | Data forwarding | — | May be optimized, e.g., direct data forwarding. | May be optimized, e.g., direct data forwarding. | May be optimized, e.g., direct data forwarding. |

TABLE 3-continued

|  | Alt 1 | Alt 2 | | |
|---|---|---|---|---|
|  |  | Alt 2-1 | Alt 2-2 | Alt 2-3 |
| Transactions towards RRC Reconfiguration | At least 4 steps. (3 steps may be possible by parallel transaction) | At least 3 steps. (2 steps may be possible by parallel transaction) FFS how many steps for the final RRC config. | At least 3 steps. FFS how many steps for the final RRC config. | At least 3 steps. FFS how many steps for the final RRC config. |

The simplest extension may be Alt 1, although the other alternatives may have potential to optimize the inter-MeNB handover procedure. However, the pros and cons can be foreseen in all alternatives.

[Additional Statement 3]

1. Introduction

In this additional statement, from S1/X2 connectivity point of view the requirements to support the inter-MeNB handover without SeNB change are discussed based on possible deployment scenarios.

2.1. Deployment Scenario 1 (Basic Scenario)

Figure 34:
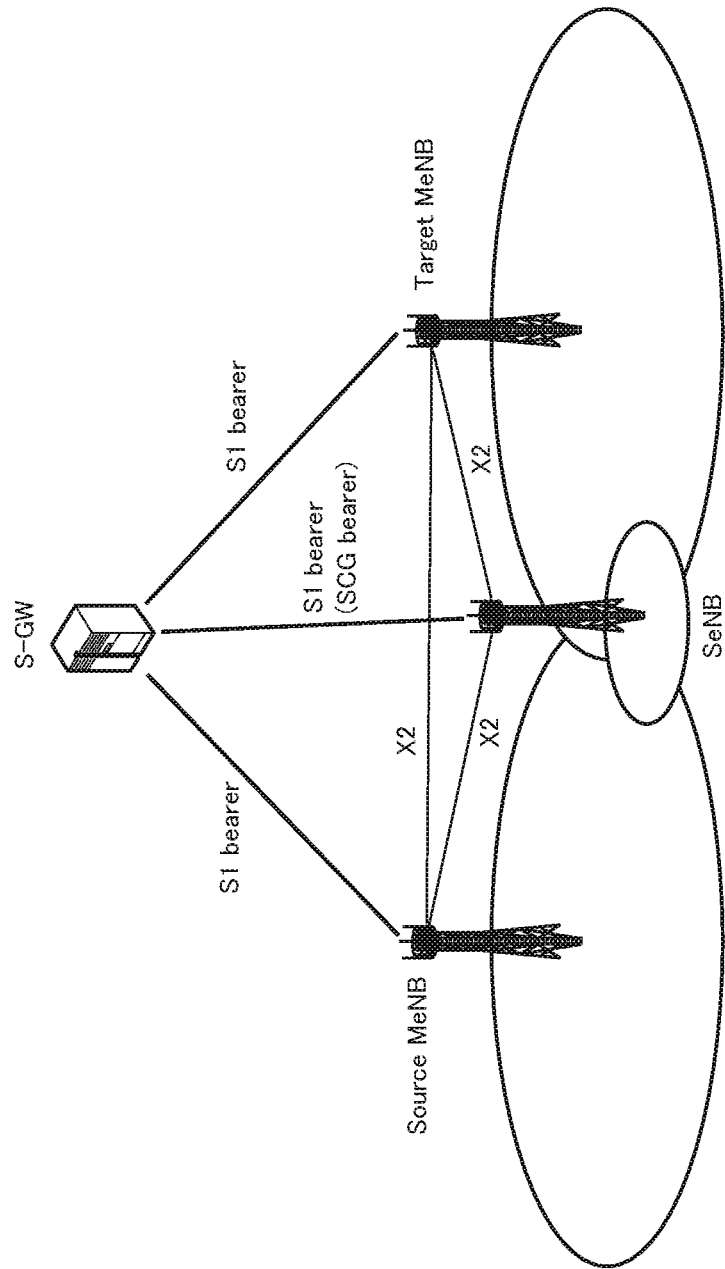
FIG. 34 is a diagram according to an additional statement 3 of embodiments.
Figure 35:
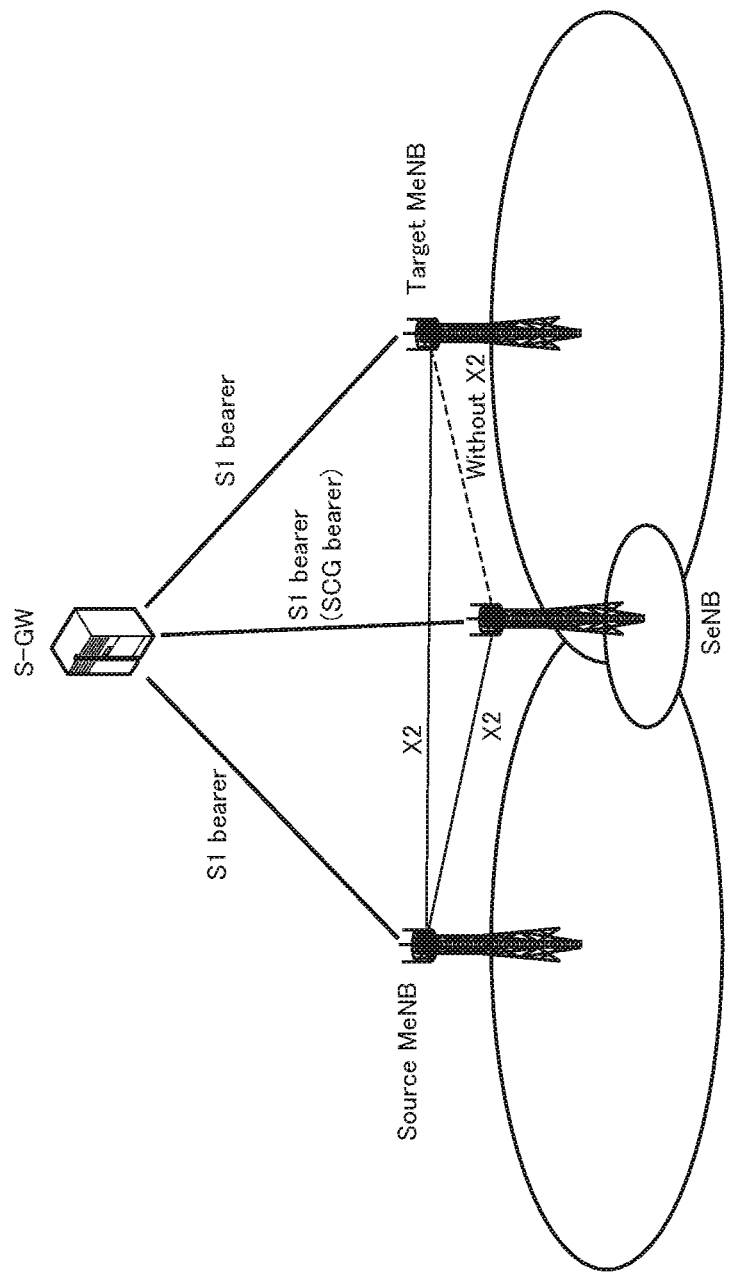
FIG. 35 is a diagram according to the additional statement 3 of embodiments.

FIG. 34 illustrates a basic deployment scenario, where the X2s are available between the source MeNB and the target MeNB and also between the MeNBs and the SeNB which is located within the handover region between the MeNBs. In addition, the S1s of all eNBs are connected to the same S-GW.

In this deployment scenario, the overall handover procedure, including the Handover Preparation and the Path Switch Request, may need to be re-considered, from the following aspects;

Bearer Information;

For the E-RAB management, the target MeNB may need information of each E-RAB, which is established over S1/X2 and corresponds to already established SCG/Split bearers towards the UE, e.g. UL GTP TEID of the S-GW for each E-RAB ID corresponding to SCG bearer, DL GTP TEID of the SeNB and UL GTP TEID of the target MeNB for each E-RAB ID corresponding to Split bearer.

Observation 1: E-RAB information corresponding to already established SCG/Split bearer may need to be transferred during inter-MeNB handover.

Path Switch;

In Rel-12 or before, the handover procedure used the Path Switch Request procedure to switch the S1-U bearers from the source eNB to the target eNB. For Dual Connectivity, the E-RAB Modification Indication procedure (i.e. Path Update) was used for SCG bearer-related operation, which allows the MeNB to maintain a part of E-RABs corresponding to MCG bearers, while the other E-RABs corresponding to SCG bearers were updated towards the SeNB i.e. without change of the UL GTP TEID of the S-GW.

In consideration of Rel-13 procedure for the inter-MeNB handover with keeping SCG bearer, the UL GTP TEIDs between the S-GW and the SeNB may be required not to be changed, because those E-RABs have been already established and does not related to the MeNB handover. If the inter-MeNB handover assumes to reuse the Path Switch Request procedure, the EPC is currently allowed to change the UL GTP TEIDs of the S-GW in the procedure and it may be troublesome for the SeNB.

Observation 2: GTP TEID of the S-GW may be not allowed to change during inter-MeNB handover.

In consideration with above possible requirements, we should discuss the necessary procedures (X2 and S1) or extensions of current procedure for the inter-MeNB handover.

Proposal 1: we should discuss how to handle GTP TEID during inter-MeNB handover, taking above consideration into account.

2.2. Deployment Scenario 2 (Without X2 Between Target MeNB and SeNB)

Previous RAN2#85 meeting, there was small discussion about X2 connectivity between the target MeNB and the SeNB, therefore we reflected such discussion to the deployment assumption.

FIG. 2 shows the deployment scenario, where the X2 between the target MeNB and the SeNB is not available. There may be two cases of X2 unavailability, the temporary reasons such as network congestion and the static reasons such as no connectivity. Currently, the source MeNB does not have the means to know the X2 unavailability after the inter-MeNB handover.

Observation 3: The source MeNB does not have the information of X2 unavailability between the target MeNB and the SeNB, which may be occurred due to temporary reason or static reason.

In this deployment scenario, it may be need to clarify which eNB should have the responsibility to ensure successful inter-MeNB handover. The simple assumption is the target MeNB has the responsibility. In this case, the target MeNB may make a response with HANDOVER PREPARATION FAILURE when the X2 towards the SeNB is not available. The source MeNB may not take care of the X2 availability between other eNBs. It's FFS whether the legacy handover is allowed for this case, i.e., dual connectivity is rejected but normal handover can be performed.

It may be considered that the source MeNB has the responsibility. To facilitate the scheme, the source MeNB has the information of X2 availabilities between other eNBs, which may cause additional complexity in the source MeNB. However, with the information the number of handover preparation failures involving MeNB change can be reduced and the information may be possible to be reused for enhanced SON functions. It's FFS the source MeNB should obtain the information of X2 availability from which eNB, i.e., either the target MeNB or the SeNB, and when, e.g., upon inter-MeNB handover or periodic status reports.

We should decide which eNB have the responsibility for whether the inter-MeNB handover can be performed or not.

Proposal 2: we should decide which MeNB have the responsibility to ensure X2 connectivity between the target MeNB and the SeNB.

2.3. Deployment scenario 3 (X2 Handover with S-GW Relocation)

Figure 36:
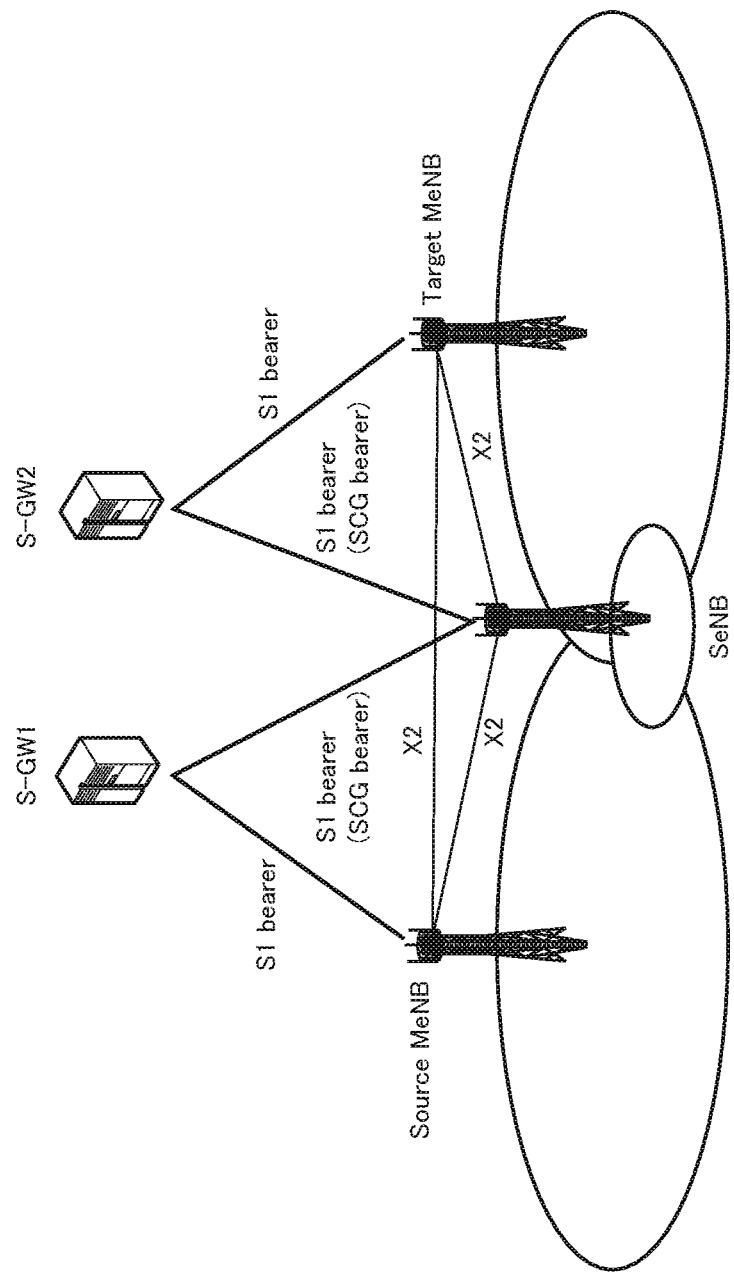
FIG. 36 is a diagram according to the additional statement 3 of embodiments.

FIG. 36 illustrates a deployment scenario where different S-GWs are connected the source MeNB and the target MeNB, and the SeNB has a connection with the both S-GWs.

According to agreements, S-GW relocation in case of SeNB addition in Dual Connectivity is prohibited. On the other hand, X2 handover with S-GW relocation is supported. The inter-MeNB handover with S-GW relocation should be possible in order to reduce the signaling load and improve the service quality of user experience, in case of the inter-MeNB handover with S-GW relocation where the source MeNB and the target MeNB are connected to the same S-GW, which is out of scope of agreements of Rel-12.

Proposal 3: The inter-MeNB handover with S-GW relocation should be possible as long as the source MeNB and the target MeNB are connected to the same S-GW.

The entire contents of U.S. provisional application No. 61/934350 (filed on Jan. 31, 2014) are incorporated herein by reference.

The invention claimed is:

1. A target master evolved Node-B (MeNB) for a mobile communication system supporting dual connectivity communication using: an MeNB that establishes a radio resource control (RRC) connection with a user equipment (UE); and a secondary evolved Node-B (SeNB) that provides additional radio resources to the UE, the target MeNB comprising:

a controller containing at least one processor and at least one memory, wherein the controller controls an inter-MeNB handover procedure that performs handover of the UE from a source MeNB to the target MeNB without changing the SeNB, wherein the controller causes the target MeNB to:

receive a handover request message from the source MeNB, the handover request message including a global eNB ID of the SeNB;

transmit an SeNB addition request message to the SeNB in response to receiving the handover request message, the SeNB addition request message used to configure the SeNB as a new SeNB for the target MeNB;

receive, from the SeNB, an SeNB addition request acknowledgement message, which is a response to the SeNB addition request message, the SeNB addition request acknowledgement message including algorithm information indicating a security algorithm selected by the SeNB to perform communication with the UE; and transmit, to the source MeNB, a handover request acknowledgement message, which is a response to the handover request message, in response to receiving the SeNB addition request acknowledgement message, the handover request acknowledgement message including the algorithm information received from the SeNB.

2. The target MeNB of claim 1, wherein the controller causes the target MeNB to transmit, to the SeNB, the SeNB addition request message including bearer type information indicating whether a bearer type to be used by the SeNB is a secondary cell group (SCG) bearer or a split bearer, wherein the SCG bearer does not pass through the MeNB, and the split bearer passes through the MeNB.

3. A secondary evolved Node-B (SeNB) for a mobile communication system supporting dual connectivity communication using: a master evolved Node-B (MeNB) that establishes a radio resource control (RRC) connection with a user equipment (UE); the SeNB providing additional radio resources to the UE, the SeNB comprising:

a controller containing at least one processor and at least one memory, wherein the controller controls an inter-MeNB handover procedure that performs handover of the UE from a source MeNB to a target MeNB without changing the SeNB, wherein the controller causes the SeNB to:

receive an SeNB addition request message from the target MeNB, the target MeNB having received a handover request message from the source MeNB, the SeNB addition request message used to configure the SeNB as a new SeNB for the target MeNB, wherein the handover request message includes a global eNB ID of the SeNB;

transmit, to the target MeNB, an SeNB addition request acknowledgement message, which is a response to the SeNB addition request message, the SeNB addition request acknowledgement message including algorithm information indicating a security algorithm used by the UE to perform communication with the SeNB;

receive, from the source MeNB, an SeNB release request message that requests releasing configurations corresponding to the source MeNB, the source MeNB receiving a handover request acknowledgement message from the target MeNB; and after receiving the SeNB release request message, receive a UE context release message from the source MeNB, the UE context release message requesting release of a UE context for the UE.

4. The SeNB of claim 3, wherein the controller further causes the SeNB to:

release configurations corresponding to the source MeNB in response to receiving the SeNB release request message.

5. The SeNB of claim 3, wherein the controller causes the SeNB to receive, from the target MeNB, the SeNB addition request message including bearer type information indicating whether a bearer type to be used by the SeNB is a secondary cell group (SCG) bearer or a split bearer, wherein the SCG bearer does not pass through the MeNB, and the split bearer passes through the MeNB.

6. The SeNB of claim 3, wherein the controller, in response to receiving the SeNB release request message from the source MeNB, causes the SeNB to release configurations corresponding to the source MeNB while keeping configurations corresponding to the target MeNB.

7. A source master evolved Node-B (MeNB) for a mobile communication system supporting dual connectivity communication using an MeNB that establishes a radio resource control (RRC) connection with a user equipment (UE) and a secondary evolved Node-B (SeNB) that provides additional radio resources to the UE, the source MeNB comprising:

a controller containing at least one processor and at least one memory, wherein the controller controls an inter-MeNB handover procedure that performs handover of the UE from the source MeNB to a target MeNB without changing the SeNB, wherein the controller causes the source MeNB to:

transmit a handover request message to the target MeNB, the handover request message including a global eNB ID of the SeNB;

receive, from the target MeNB, a handover request acknowledgement message, which is a response to the handover request message, the handover request acknowledgement message including algorithm information indicating a security algorithm selected by the SeNB to perform communication with the UE;

transmit an SeNB release request message to the SeNB in response to receiving the handover request acknowledge message, the SeNB release request message requesting release of configurations corresponding to the source MeNB;

receive a first UE context release message from the target MeNB, the first UE context release message requesting release of a UE context for the UE; and transmit a second UE context release message to the SeNB, the second UE context release message requesting release of the UE context.

8. The source MeNB of claim 7, wherein transmission of the SeNB release request message to the source MeNB enables the SeNB to release configurations corresponding to the source MeNB while keeping configurations corresponding to the target MeNB.

* * * * *